US012464273B1

(12) United States Patent
Hudson, III

(10) Patent No.: US 12,464,273 B1
(45) **Date of Patent: *Nov. 4, 2025**

(54) SOUND SYSTEM

(71) Applicant: BASS ON, LLC., Marietta, GA (US)

(72) Inventor: Joseph L. Hudson, III, Roswell, GA (US)

(73) Assignee: Bass On, LLC, Marietta, GA (US)

( * ) Notice: Subject to any disclaimer, the term of this patent is extended or adjusted under 35 U.S.C. 154(b) by 260 days.

This patent is subject to a terminal disclaimer.

(21) Appl. No.: 18/311,754

(22) Filed: May 3, 2023

Related U.S. Application Data

(63) Continuation-in-part of application No. 17/645,363, filed on Dec. 21, 2021, now Pat. No. 11,653,130, which is a continuation of application No. 17/076,258, filed on Oct. 21, 2020, now Pat. No. 11,228,825, which is a continuation-in-part of application No. 16/657,345, filed on Oct. 18, 2019, now Pat. No. 10,820,103, which is a continuation-in-part of application No. 15/954,184, filed on Apr. 16, 2018, now Pat. No. 10,575,076.

(60) Provisional application No. 62/486,223, filed on Apr. 17, 2017.

(51) Int. Cl.
*H04R 1/02* (2006.01)

(52) U.S. Cl.
CPC .................................... *H04R 1/025* (2013.01)

(58) Field of Classification Search
CPC .............................. H04R 1/025; H04R 1/2811
USPC .......................................................... 381/388
See application file for complete search history.

(56) References Cited

U.S. PATENT DOCUMENTS

2009/0067657 A1* 3/2009 Yasushi .................. H04R 5/023 381/333
2014/0233747 A1* 8/2014 Fox .................. G10K 11/17861 381/71.1
2017/0214988 A1* 7/2017 Ferretti .................... B60N 2/68
2021/0323451 A1* 10/2021 Fam ..................... B60N 2/0022

* cited by examiner

*Primary Examiner* — Sean H Nguyen
(74) *Attorney, Agent, or Firm* — Rosenberg, Klein & Lee

(57) ABSTRACT

A sound system is shown in the form of a speaker with or without a speaker box. A front member may be used with a speaker support, with the speaker mounted to the speaker support, thus comprising a speaker assembly. The front member of the speaker assembly may include an elongate open portion with a top end and a bottom end and the speaker positioned adjacent to the elongate open portion between the top end and the bottom end. The speaker assembly may be coupled to a portion of the vehicle seat which is not obstructive to the positioning of a user in the vehicle seat. This combination may be used in a vehicle seat but also in a backpack, a chair, personal gaming seat, arcade gaming seat, gambling machine seat, bed, massage table or any other similar device.

21 Claims, 37 Drawing Sheets

SOUND SYSTEM

CROSS-REFERENCE TO RELATED APPLICATION DATA

This application is a continuation-in-part of application Ser. No. 17/645,363 filed Dec. 21, 2021, which is a continuation of application Ser. No. 17/076,258 filed Oct. 21, 2020, which is a continuation-in-part for application Ser. No. 16/657,345 filed on Oct. 18, 2019, which is a continuation-in-part of application Ser. No. 15/954,184 filed on Apr. 16, 2018, for which priority is claimed under 35 U.S.C. § 119 (e) to U.S. Provisional Application No. 62/486,223, filed on Apr. 17, 2017, which is incorporated by reference herein.

FIELD OF THE INVENTION

The present invention generally relates to sound technology, more particularly, to a speaker directed to interact with the human body.

BACKGROUND OF THE INVENTION

Entertainment has become an integrated part of our culture. Movies, television shows and video games each have carved out a following with people of all walks of life. The goal in any form of entertainment is to create an experience that is as close as possible to the fantasy created on the film or computer. One aspect is the visual effects. Here they make what we see to be as close as possible to the real world. Other aspects are what we feel through our body and hear through our ears, and some of what we "hear" is actually what we feel through pressure changes on our skin. With that, the audio interface between the body and the chair, or other furniture that is supporting the body, is a vitally important part of the entertainment experience, including in a theater or at home.

Low frequency sound may produce both a tactile and auditory response from the body, especially if properly done. The body's perception of sound and vibration may be hard wired to the brain, thus eliminating the need for the brain to spend time processing that information. This time delay due to mental processing may be required with visual stimuli. The patellar reflex used by physicians by sharply contacting the patella tendon under the knee is an example. The brain does not need to invest much to process that information in order for the muscle to contract and move the foot. Also, if someone scares you by producing a loud noise or unexpectedly touching you, or both, will cause a rapid response compared to seeing something, even something potentially dangerous. The visual response can result in the person freezing or not moving until the brain decides what to do.

The variation in processing visual input as compared to auditory and tactile stimuli may also be determined by the time it takes for the stimuli to reach the body. Sound travels at 767 mph. Light travels at $670\times10^{6}$ mph or almost a million times faster. That alone would suggest that the combination of sound pressure, to provide both auditory and a tactile response, and visual light should not originate in the same location relative to the user if the end result is a realistic sensory experience of audio, tactile and visual stimuli. Visual stimulus originating from a hundred yards away will reach the eye in $3.05\times10^{-7}$ sec (0.000305 milliseconds) compared to a sound wave, which would take about 0.267 seconds to travel the same distance.

It should, therefore, be appreciated that there is a need for a speaker capable of producing a low frequency output to produce a high pressure area that the user may be positioned to optimally take advantage of this high pressure area, which may also reduce unwanted sound to the rest of the room. The present invention fulfills this need and others.

SUMMARY OF THE INVENTION

The present invention may include a sound system of the type including a speaker, including a front member with an elongate open portion with a top end and a bottom end and a speaker support with the speaker mounted to the speaker support. The speaker support may be coupled to the front member with a front of the speaker facing the front member and the front of the speaker substantially aligned with the bottom end of the elongate open portion. The bottom end of the elongate open portion may be positioned adjacent to a lower portion of the back of the torso of a user and the top end of the open portion is positioned higher near the back of the torso of the user.

The speaker may be a low frequency producing speaker adapted to produce sound energy below 200 Hz, or even below 100 Hz. A back of the speaker may not be enclosed in a speaker box, whereby sound energy emitted from the back of the speaker may be substantially free to travel away from the back of the speaker. The speaker support and the front member may be manufactured from a single piece of material.

A vent may be provided which may be continuous with the open portion. The vent may provide a continuation of the open portion through to an end of the open portion. The vent may be positioned at the top end of the open portion.

The speaker, speaker support and the front member may be provided in a backpack with the open portion of the front member facing toward a pair of shoulder straps of the backpack. Alternatively, the speaker, speaker support and the front member may all be positioned in a seatback of a chair. The front of the speaker may be substantially aligned with a lower portion of the torso of a user seated in the chair and the open portion of the front member may face toward the user seated in the chair. A back of the speaker may be not enclosed in a box, whereby sound energy emitted from the back of the speaker may be substantially free to travel away from the back of the speaker outside of the chair.

The speaker, speaker support and the front member may all be positioned in a speaker pillow, the speaker pillow may include a front cushion positioned adjacent to the open portion of the front member, the front cushion may provide a pliable support against the back of the user. The speaker pillow may further include a rear cushion which may provide support to a back of the speaker. The rear cushion may be coupled to the speaker support. A back of the speaker may be not enclosed in a box, whereby sound energy emitted from the back of the speaker may be substantially free to travel away from the back of the speaker and through the speaker pillow.

For purposes of summarizing the invention and the advantages achieved over the prior art, certain advantages of the invention have been described herein. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular preferred embodiment(s) disclosed.

BRIEF DESCRIPTION OF THE DRA WINGS

Embodiments of the present invention will now be described, by way of example only, with reference to the following drawings, in which.

DETAILED DESCRIPTION OF THE INVENTION

Figure 1:
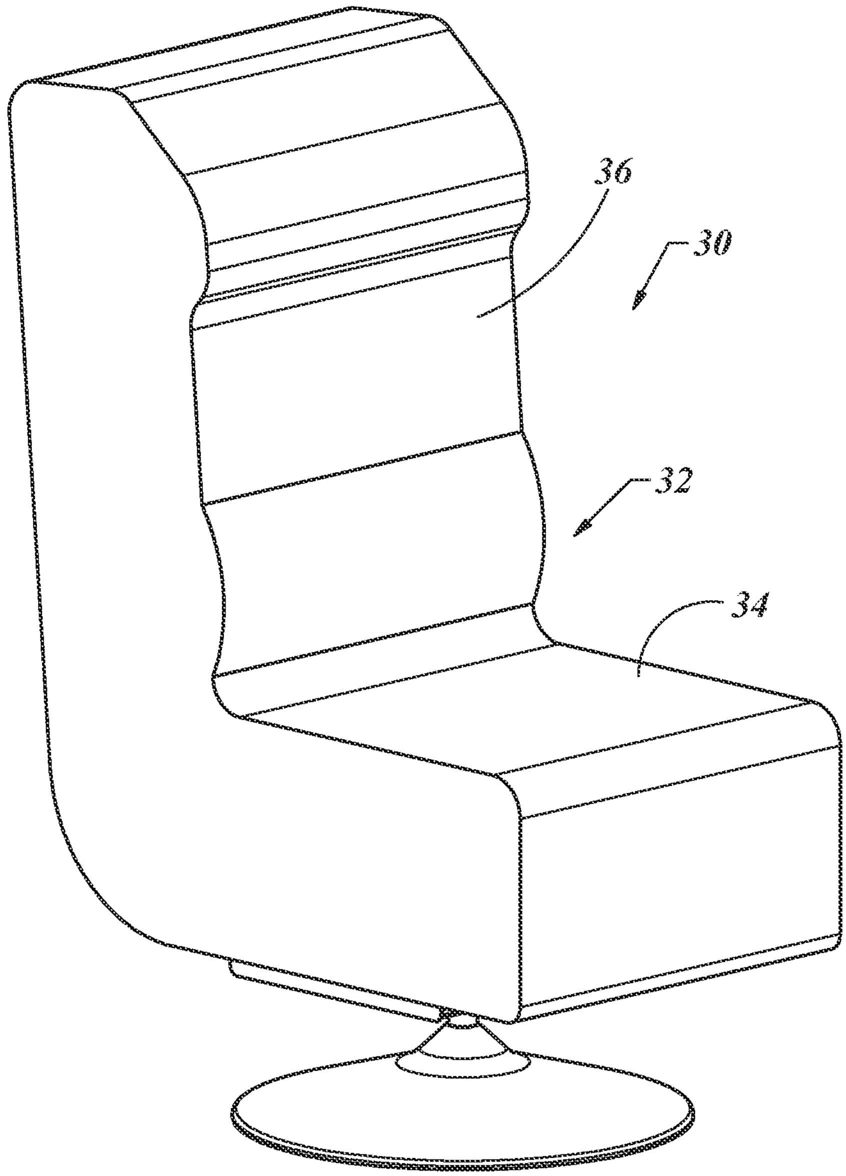
FIG. 1 is an isometric view of a media chair, presented in accordance with the present invention.
Figure 2:
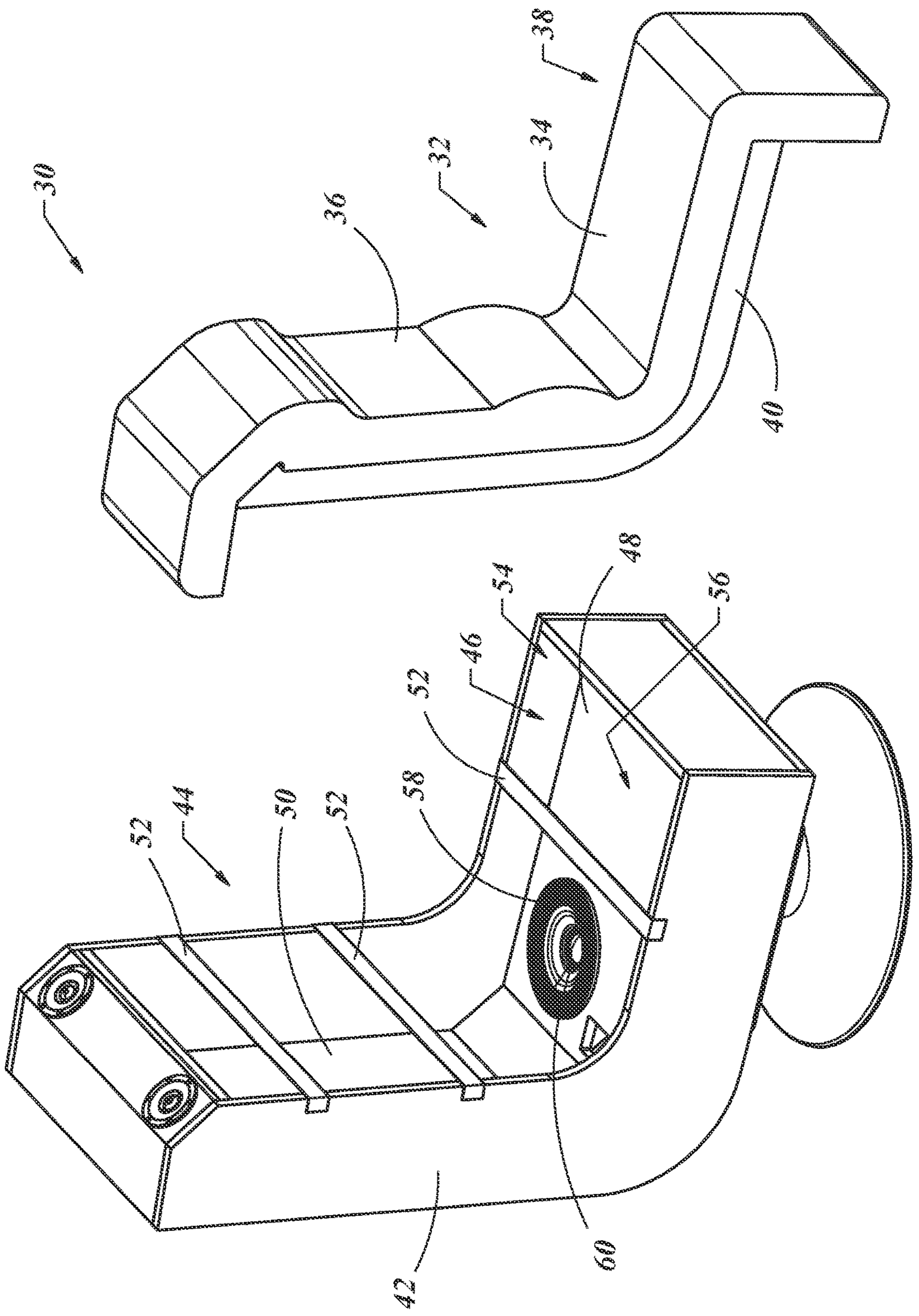
FIG. 2 is an isometric view of a media chair presented in FIG. 1, with the cushion removed and cut in half to show the shape of the cushion.

With reference to the illustrative drawings, and particularly to FIGS. 1-2, there is shown a media chair 30. A seat cushion 32 may be provided so as to provide a comfortable seat bottom 34, which may support the hips and upper legs of a user and a seat back 36, which may support the torso of the user.

The view of the seat cushion 32 in FIG. 2 is shown to be cut in half so as to better illustrate an embodiment of the seat cushion 32. The seat cushion 32 may include a seat pad 38, which may include the seat bottom 34 and the seat back 36. A side flange 40 may be provided on one or both sides of the seat pad 38. The side flange 40 may be fastened to the side frames 42 of the seat frame 44, to secure the seat cushion 32 to the seat frame 44.

The seat frame 44 may be comprised of two side frames 42 connected to a first surface 46. The first surface 46 may include a seat bottom frame support 48 and the seat back frame support 50, together creating a substantially continuous surface connected to the side frames 42. One or more seat supports 52 may be mounted to the side frames 42 and positioned away from the seat bottom frame support 48 and the seat back frame support 50, thus defining a second surface 54. The area between the first surface 46 and the second surface 54 and bounded by the side frames 42, may define a front chamber 56. In this embodiment, the front chamber 56 may include a continuous area under the seat bottom 34 and behind the seat back 36 of the seat cushion 32.

A speaker 58 may be provided in the seat bottom frame support 48 with the speaker cone 60 positioned in the front chamber 56. When sound energy is driven into the front chamber 56 by way of the speaker 58, the front chamber 56 may show an increase in gas pressure as compared to the ambient pressure outside of the front chamber 56 of the seat frame 44. This increase in gas pressure in the front chamber 56 may be directed through the seat cushion 32 and directly into a user seated on the seat cushion 32.

An area of increased pressure, such as that may be produced by the speaker 58 by the sound pressure or sound energy provided into the front chamber 56, may be referred to as a plenum. This plenum may also be created in a room by a speaker that produces sound energy at or below 200 Hz, and optionally below 100 Hz. The inefficiency with creating a plenum that is the size of a room may be illustrated by the power necessary to drive the low-frequency subwoofer to a level to produce an adequate plenum. A movie theater may use multiple low frequency speakers, requiring several thousand watts. This is necessary because that sound energy must fill the entire room in order to create a plenum for the user in a chair to experience not only the auditory stimulus from the speaker but also the tactile stimulation on the skin. With a system as shown and described herein, a single speaker 58 may need only an input of 10 to 30 watts to provide the user with a much greater stimulus compared to potentially thousands of watts necessary to fill an entire room. By placing the user directly in, or directly adjacent to, the plenum created by the speaker 58, the energy from the speaker 58 is much more impactful to the user relative to trying to create a plenum in a large room in which the occupants take up only a small portion of the volume of that room.

Another advantage to creating an individual plenum for each user is the reduction of wasted sound energy that may then disturb others. In a home theater, for example, there may be other members of the household that are not in the theater. If hundreds, if not thousands of watts of power are pumped into the home theater room to attempt to achieve the same stimulus to the user as would be the case with an individual plenum for each user, other members of the household may be disrupted by the unnecessary sound energy emanating from the home theater room. With the present invention, one or more chairs may be provided, each with their own speaker 58 positioned to create an individual plenum for each user. Also, only the seats that have a user seated in it need to be powered at all, and those that are powered only require a relatively minimal amount of power to drive each individual speaker 58, thus saving money and resources by not wasting power.

Figure 3:
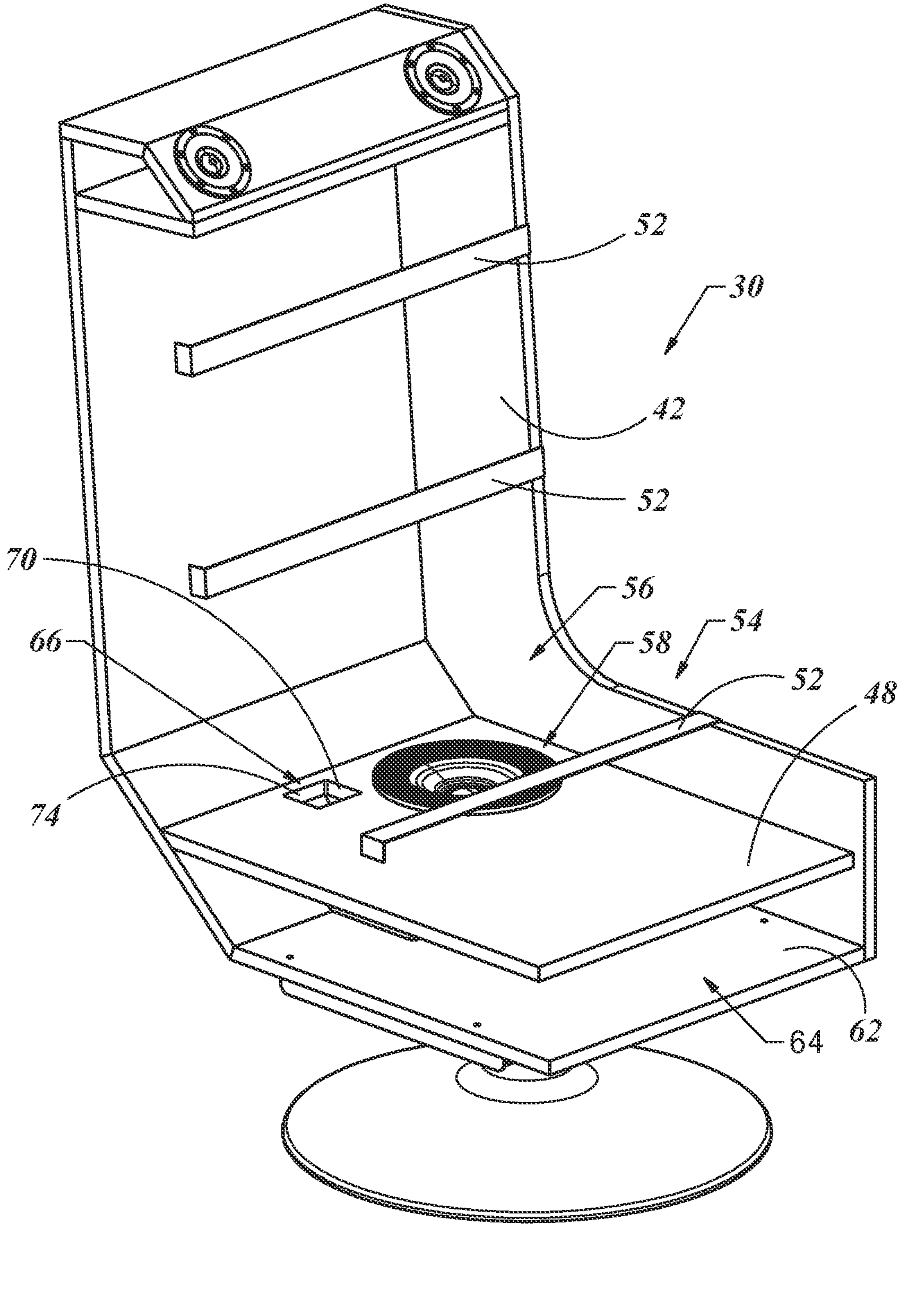
FIG. 3 is an isometric view of the media chair as presented in FIG. 1, with the cushion removed as well as the front and some of the side edges of the chair frame.
Figure 4:
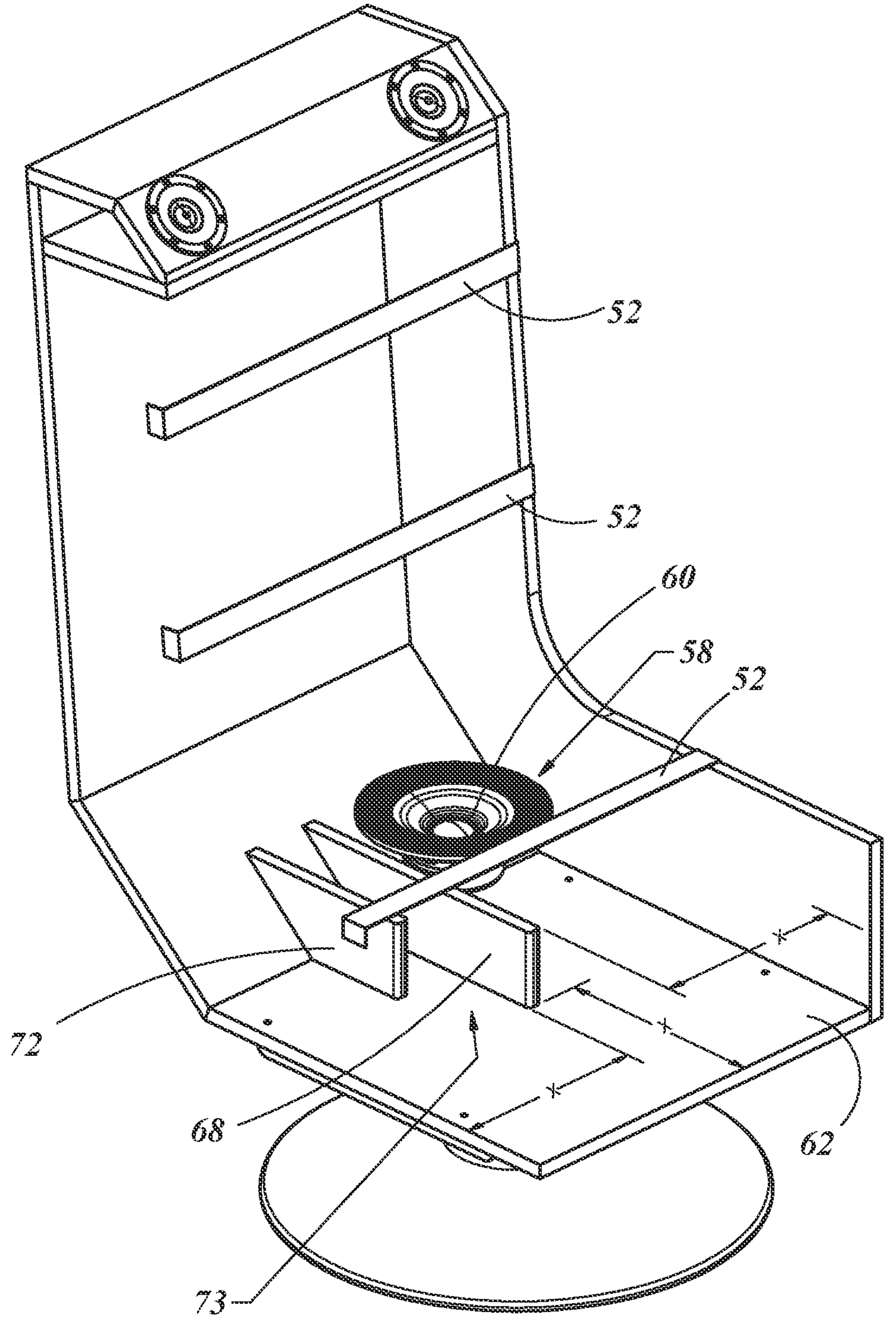
FIG. 4 is an isometric view of the media chair as presented in FIG. 3, with the seat bottom frame support removed to show the long vent extension and the short vent extension.

As is shown in FIGS. 3-8, additional details of this embodiment of the media chair 30 are shown. In FIG. 3 one of the side frames 42 has been removed to better show the front chamber 56 and some of the components. The seat bottom frame support 48 is shown in this embodiment to be positioned between the second surface 54 and the seat base 62. The space between the seat bottom frame support 48 and the seat base 62 may define a back chamber 64. The back chamber 64 may have fluid access to and from the front chamber 56 by way of a vent port 66. As is shown in FIG. 4, the seat bottom frame support 48 has been removed to show the location of the speaker 58 relative to a long vent extension 68. The long vent extension 68 may provide a continuous surface contacting both the seat base 62 and the seat bottom frame support 48. The long vent extension 68 may have a long dimension greater than the diameter of the speaker 58. The long vent extension 68 may also provide structural support to the media chair 30. The long vent extension 68 may be positioned such that a surface of the long vent extension 68 may be continuous with a first edge 70 of the vent port 66, located in the seat bottom frame support 48.

A short vent extension 72 may be positioned substantially parallel to the long vent extension 68. The short vent extension 72 may include a surface that is continuous with a second edge 74 of the vent port 66. The combination of the long vent extension 68 and the short vent extension 72 may be defined as a port duct 73 and may provide a fluid pathway for the movement of air, or any other gas, from the front chamber 56 to the back chamber 64 by way of the vent port 66 and displace any turbulent flow away from the speaker 58.

Figure 10:
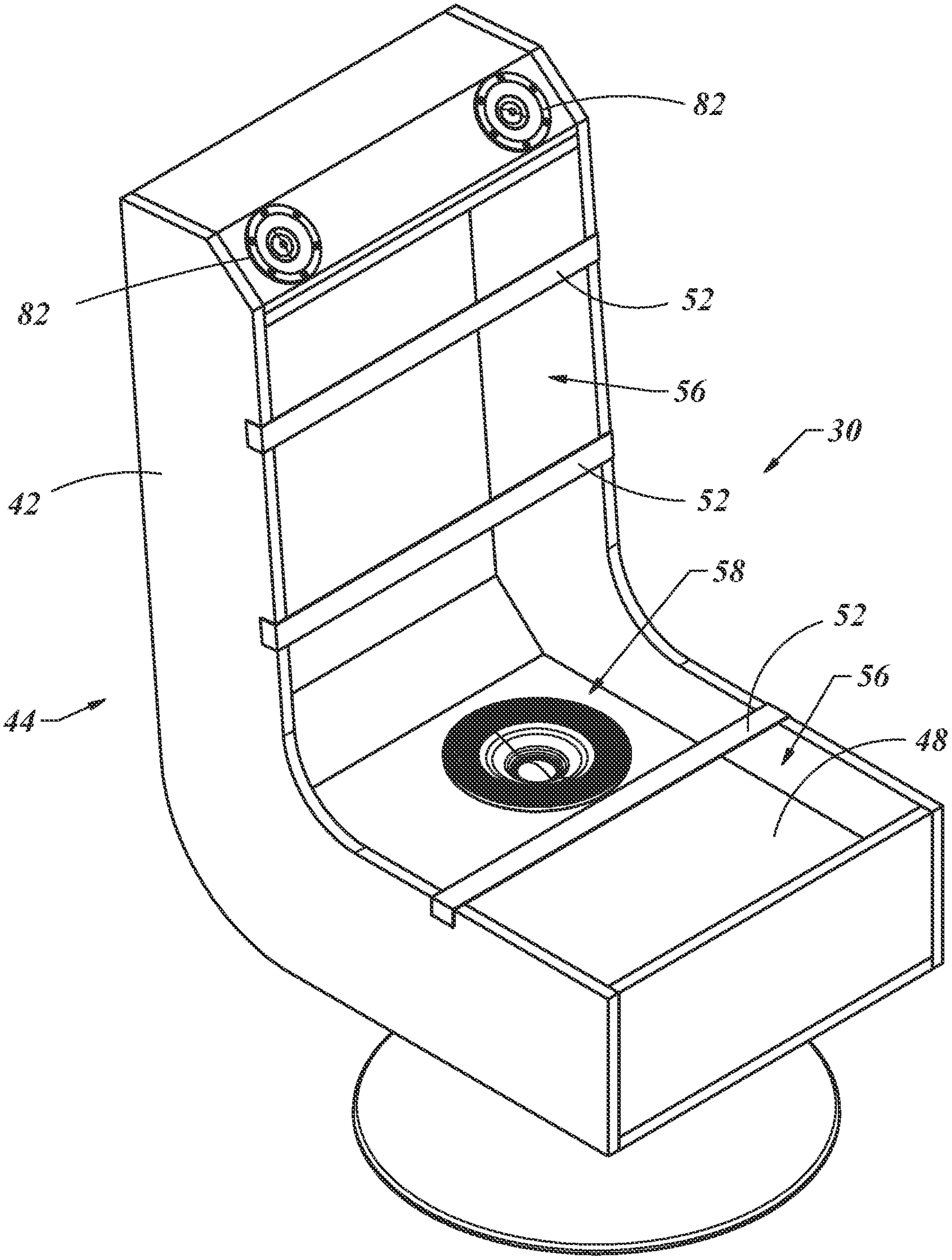
FIG. 10 is an isometric view of a media chair as shown in FIG. 2 with the vent port removed.

The purpose of the vent port 66 has some advantages, including increasing sound pressure provided by the low-frequency speaker 58 as compared to a system that does not have a vent port 66. The vent port 66 is not considered mandatory relative to the novelty of the disclosed invention. As such, a version of the media chair 30 is shown in FIG. 10 which does not have a vent port 66. The vent port 66 allows sound pressure to be redirected from the rear of the speaker cone 60 and adds it to the sound coming from the front of the speaker, making the bass louder. Another advantage to the use of a vent port 66 is that the airflow provided to the speaker 58 keeps the speaker 58 cooler, which may increase the lifespan of the speaker 58.

For some types of music the user may want a bass sound without a vent port. In that case, it may be desirable to not use a vent port 66, as is shown in FIG. 10. In that an advantage to the placement of the user in, or adjacent to, the plenum generated by the speaker 58 and the reduction in power necessary to provide the intended auditory and tactile stimulation to the user from the speaker 58, it is expected that most users may prefer the greater stimulus provided to the user by a system which includes a vent port 66. As such, the majority of the disclosure will include a vent port 66, though it is understood that the vent port 66 is not a mandatory element of the invention.

In many embodiments of the present invention, the media chair 30 may include one or more seat supports 52 which may be physically connected to each of the two side frames 42. The seat supports 52 are intended to be substantially rigid in that they may be capable of supporting the weight of a user, yet be somewhat acoustically invisible. As shown throughout this disclosure, the seat supports 52 are depicted as straps of minimal width. This reduced cross-section may allow for the sound energy created by the speaker 58 to be transferred through the seat cushion 32 and to the user. It is understood that the seat supports 52 in this form, or any number of variations, could also be incorporated into the construction of the seat cushion 32. Throughout this disclosure the seat supports 52 are shown separate from the seat cushion 32 so as to help define the location of the second surface 54 of the seat frame 44.

Figure 6:
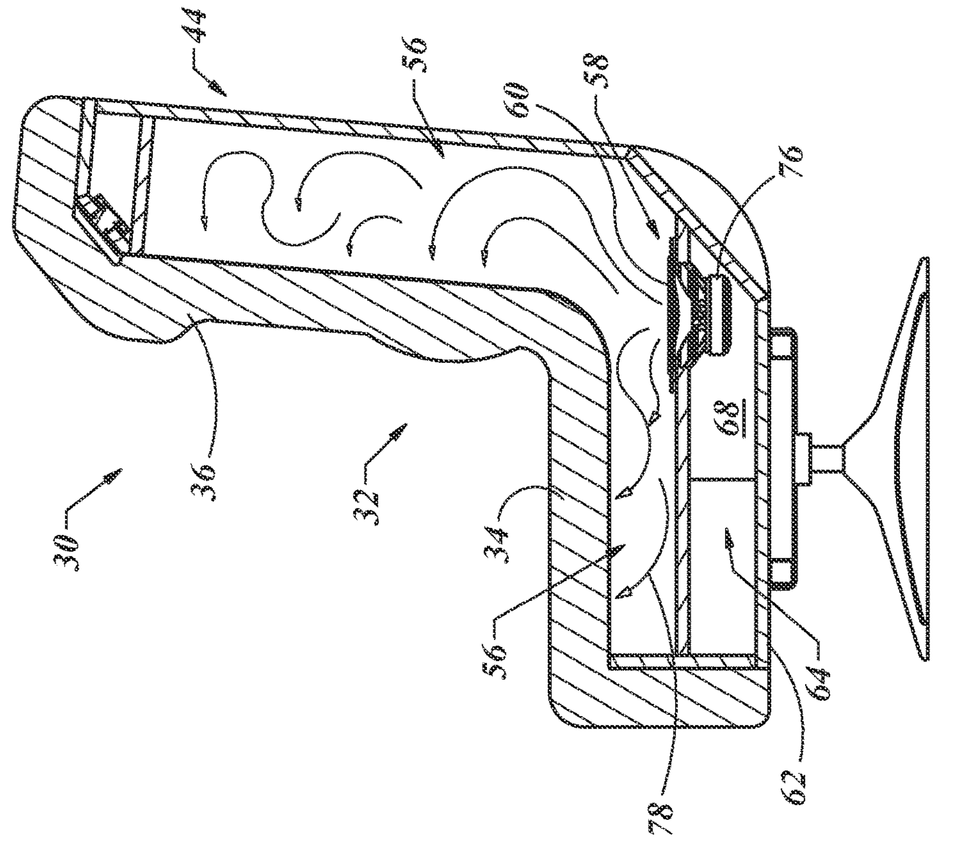
FIG. 6 is side sectioned view of a media chair as presented in FIG. 5 cut along section line 6-6.
Figure 5:
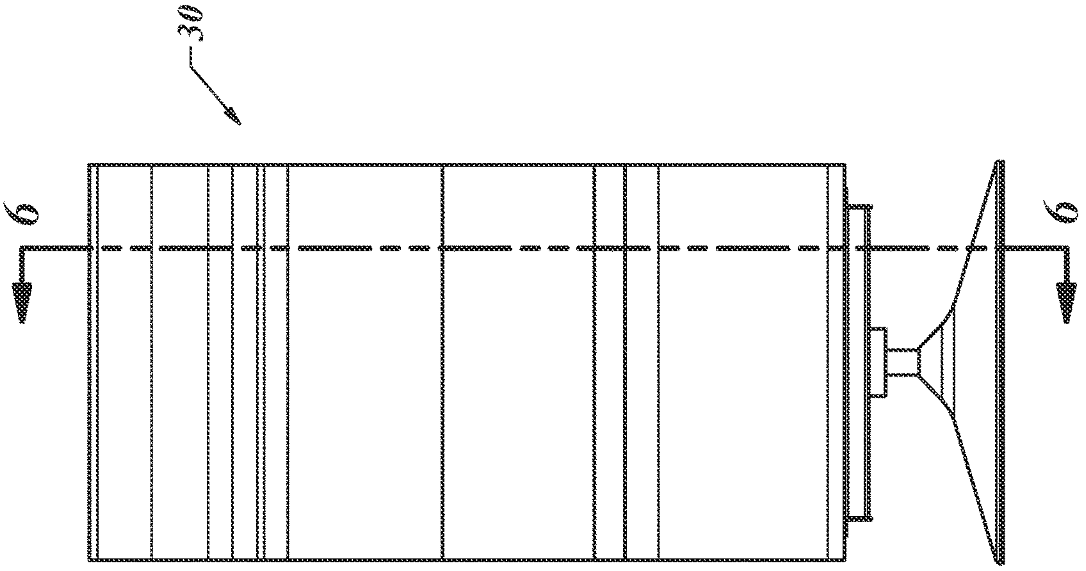
FIG. 5 is a front view of a media chair as presented in FIG. 1 showing the location of section line 6-6.

As is shown in FIGS. 5-6, a front view of the media chair 30 is shown in FIG. 5 and a section line 6-6 is also provided in this view. FIG. 6 shows a depiction of the media chair 30 cut along the section line 6-6. The speaker 58 may include a speaker cone 60, which may be present in the front chamber 56 of the media chair 30. The speaker 58 may also include a speaker body 76, which may be provided in the back chamber 64 of the media chair 30. The long vent extension 68 may be provided in the back chamber 64 and be continuous with both the seat bottom frame support 48 and the seat base 62.

The front chamber 56 may see an increase in gas pressure when the speaker 58 is being driven, thus increasing the sound energy in the front chamber 56. A series of gas pressure lines 78 have been used to illustrate an example of the flow of sound energy from the speaker 58 throughout the front chamber 56. These gas pressure lines 78 are for illustrative purposes only and intended to show an increase in sound pressure, or sound energy, inside the front chamber 56 relative to outside the media chair 30. This increased pressure area of the front chamber 56 may move through seat cushion 32 and therefore transfer to a user sitting on the seat cushion 32, as the permeability to sound energy of the seat cushion 32 may be greater than that of the rest of the seat frame 44. The result may be an extension of the plenum created by the speaker 58 through the seat cushion 32 and therefore engulfing a user sitting on the seat cushion 32, thereby transferring some of the sound energy directly into the user, rather than have it enter the room, bounce off a wall and then make it back to the user.

For the purposes of this disclosure the term "gas pressure" may be analogous with "air pressure" in that the state of the current technology uses air to carry the sound energy produced by the speaker 58. It is understood that at some time in the future it may become advantageous to alter the makeup of the gas from simply ambient air to another compressible fluid or a combination that may prove to be more efficient with the process of transmitting sound energy. For this purpose, the term "gas pressure" is used to include all compressible fluids, including air.

Figure 7:
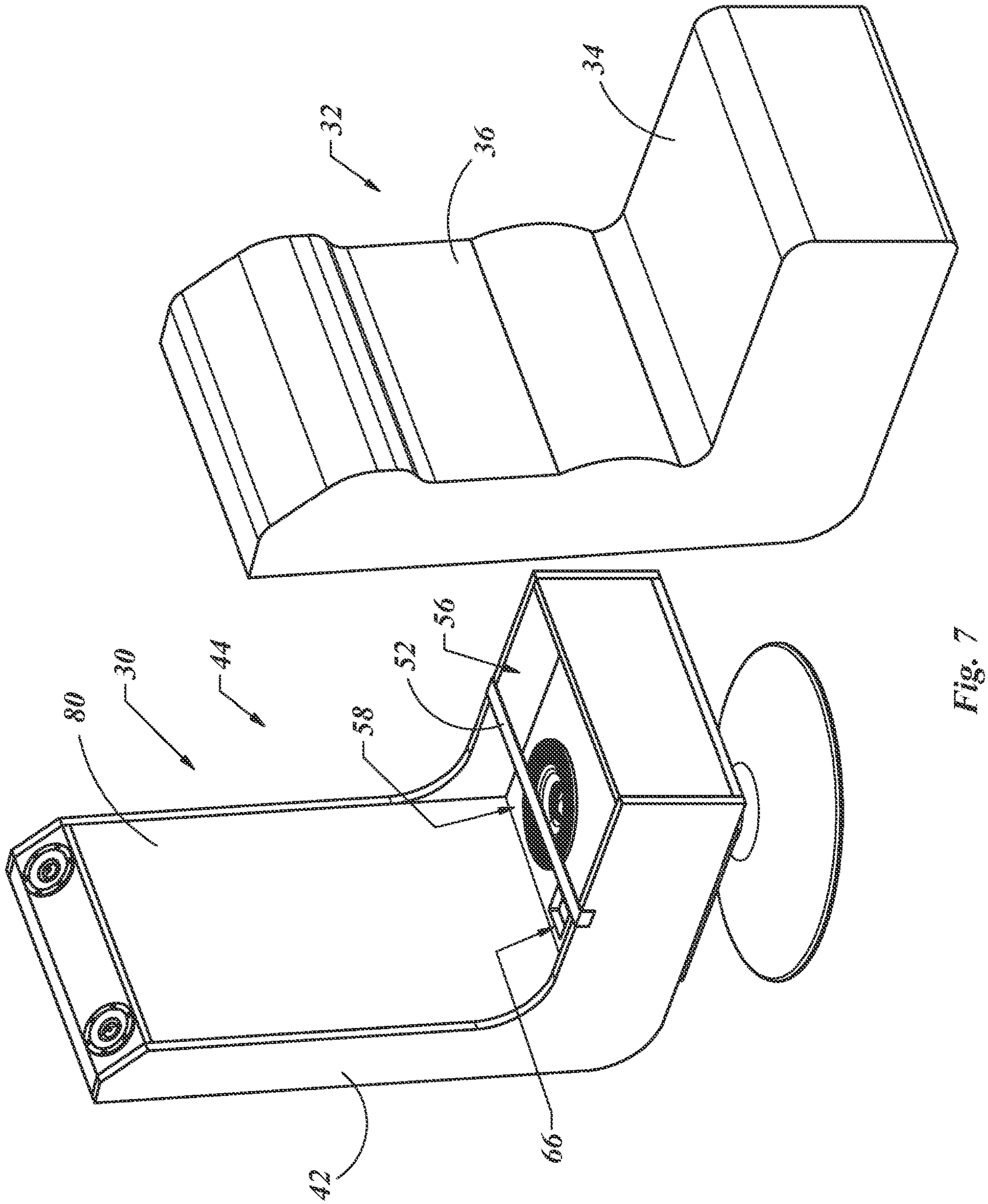
FIG. 7 is an isometric view of a media chair with the cushion removed and a front chamber and a speaker positioned in the seat bottom of the media chair.

The plenum created by the speaker 58 may include the area under the seat bottom 34, behind the seat back 36 of the seat cushion 32 when assembled onto the seat frame 44, or both as shown, or be compartmentalized to one or the other. FIG. 7 shows a media chair 30 with the speaker 58 in the seat frame 44 where the plenum may be primarily directed to the area under the seat bottom 34 when the seat cushion 32 is assembled onto the seat frame 44. As noted earlier, one or more seat supports 52 may be used to provide a minimalist structural support for the seat cushion 32 and allow the plenum area to be partially confined by the front chamber 56. In this embodiment, the back of the seat frame 44 may include a seat back front support 80. The seat back front support 80 may provide direct support for the back of the seat cushion 32, thus eliminating the need for seat supports 52 on the inside of the seat back 36. By doing so, the plenum area, and therefore the front chamber 56 may not extend into the seat back 36, and may be primarily confined to the seat bottom 34 of the seat cushion 32 when assembled. The sound energy produced in the front chamber 56 may also be directed to the user by the seat back 36.

Figure 8:
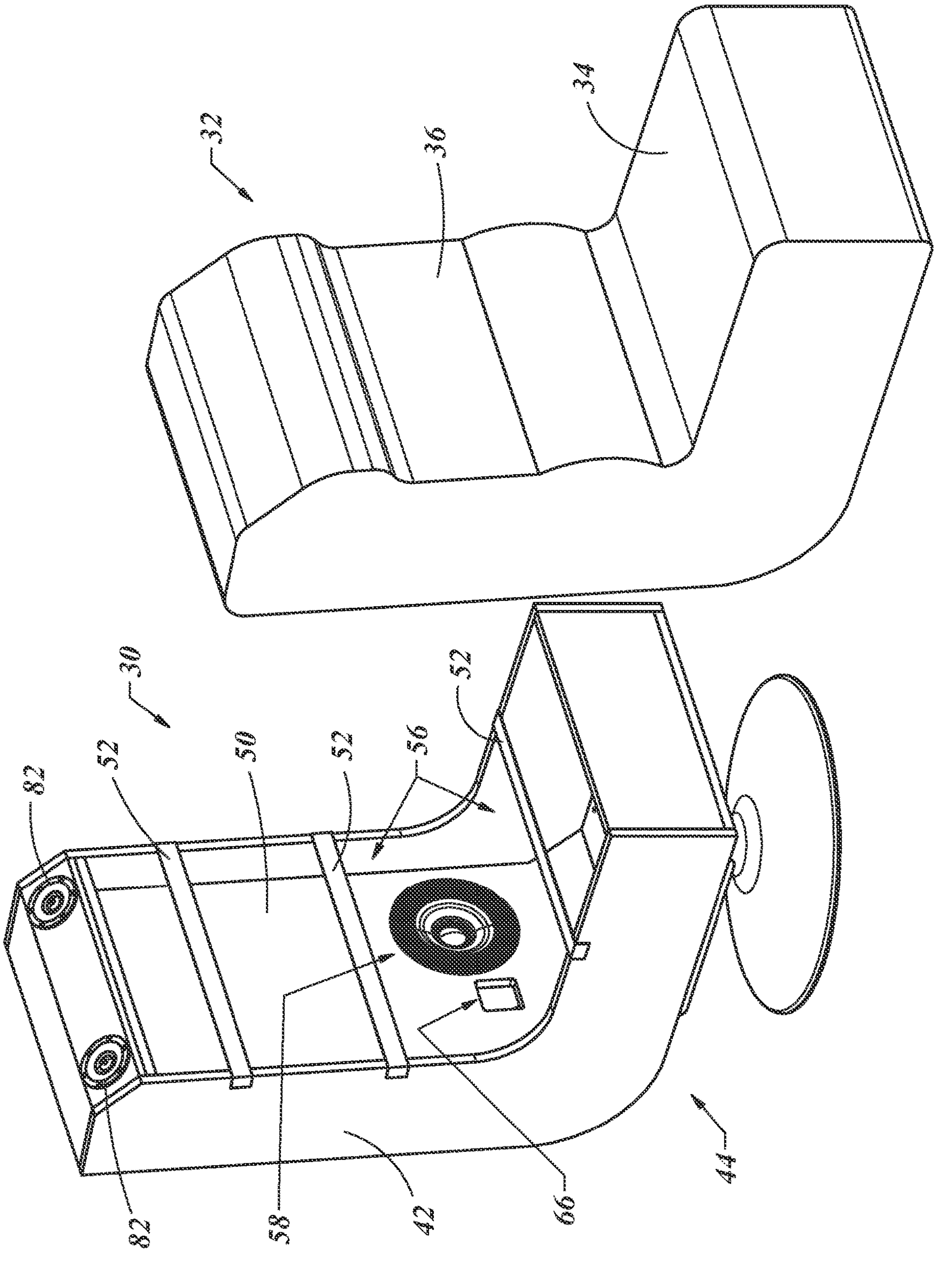
FIG. 8 is an isometric view of a media chair with the cushion removed and a front chamber positioned in the seat bottom and seat back of the media chair, with the speaker in the seat back.

It may also be desirable to place the speaker 58 in the back of the seat frame 44 as opposed to under the seat bottom 34 of the seat cushion 32. A version of this embodiment is shown in FIG. 8. The speaker 58 may be positioned in a lower portion of the seat frame 44 so that sound energy produced by the speaker 58 may not only fill the space between the seat supports 52 on the back of the seat frame 44, but also in the bottom of the seat frame 44. This thereby defining the front chamber 56 to include the area behind the seat back 36 and under the seat bottom 34 of the seat cushion 32. A vent port 66 may also be included in the seat back front support 80 to provide ventilation to the back of the speaker 58, as previously noted.

In many of the embodiments a set of high, middle or full range frequency speakers 82 may also be provided, and located in the back of the seat frame 44, or any number of other locations. These higher frequency speakers 82 may be positioned adjacent to the user's ears when seated in the chair 30 or positioned in the armrests to produce a sound stage in front of the user's ears. The higher frequency speakers 82 may perform in a manner that is common for higher frequency speakers 82 and work outside of the plenum provided by the speaker 58 in the front chamber 56.

Figure 9:
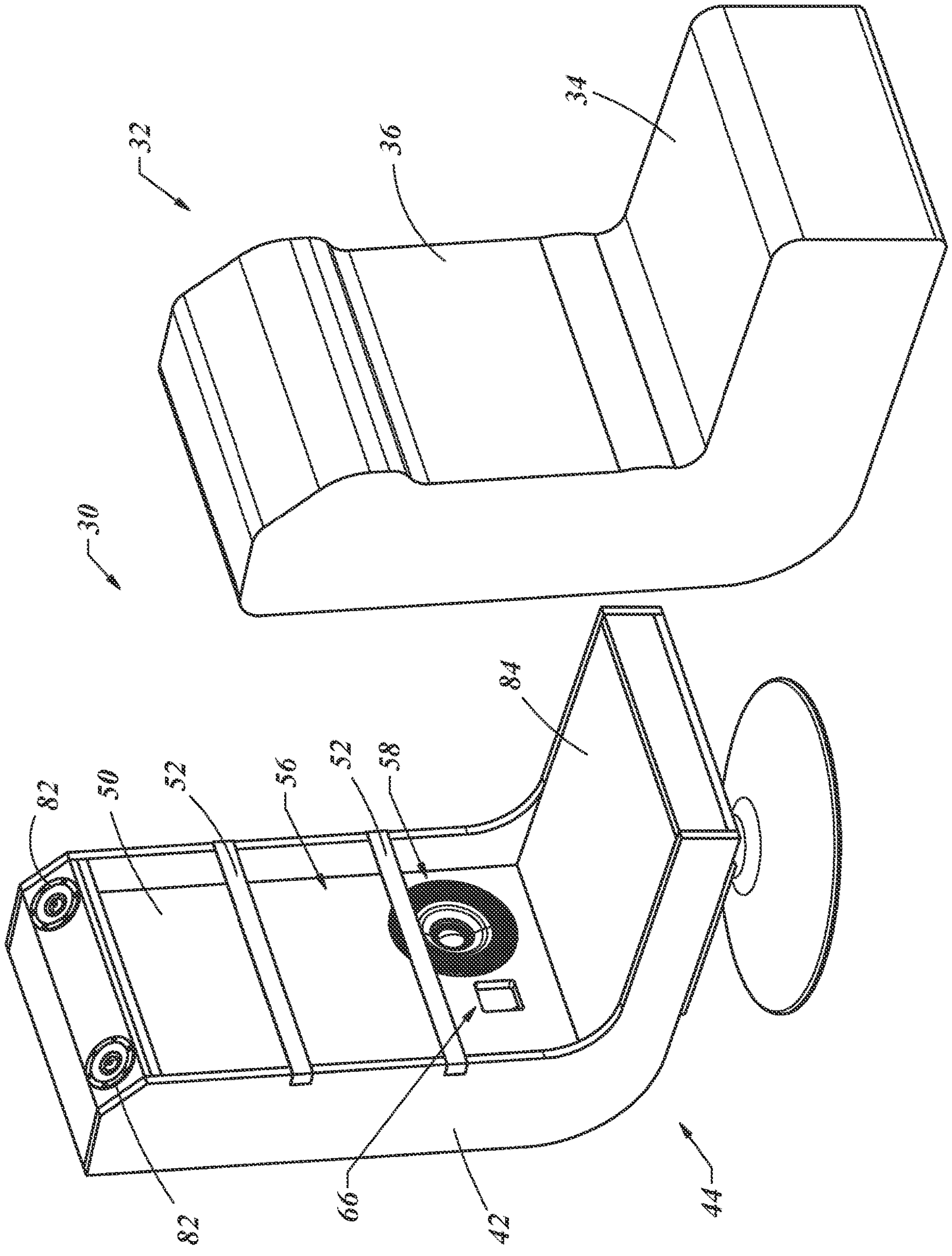
FIG. 9 is an isometric view of a media chair with the cushion removed and a front chamber positioned primarily in the seat back of the media chair, with the speaker in the seat back.

Another embodiment of the present invention 30 is shown in FIG. 9. In this embodiment, as shown previously, the speaker 58 may be provided in the back portion of the seat frame 44, and may include a vent port 66 near the speaker 58. One or more seat supports 52 may be used to offer a substantially audio invisible support for the back of the seat cushion 32 when positioned on the seat frame 44. In this embodiment, the bottom of the seat frame 44 may include a seat bottom top support 84, providing direct support for the seat bottom 34 of the seat cushion 32. The presence of the seat bottom top support 84 may restrict the front chamber 56 to the back portion of the seat frame 44 and therefore the plenum area may not include the area under the seat bottom 34 of the cushion 32.

The use of the vent port 66 has been shown and discussed previously. In some embodiments it may be desirable to not include a vent port 66. An example of this embodiment is shown in FIG. 10. The media chair 30 may include a seat frame 44 with a pair of side frames 42. The speaker 58 is shown here to be in the bottom portion of the seat frame 44, but it could also be in the back portion of the seat frame 44, as may be shown in FIG. 8, but without the vent port 66. The seat bottom frame support 48 may be provided to support the speaker 58 so as to provide a front chamber 56 in the bottom portion and the back portion of the seat frame 44. In this embodiment, the seat bottom frame support 48 does not include a vent port 66. The absence of the vent port 66 may restrict airflow to the back of the speaker 58, which may be desirable for some types of music. In that case, it may be desirable to not include a vent port 66, as is shown here.

Figure 11:
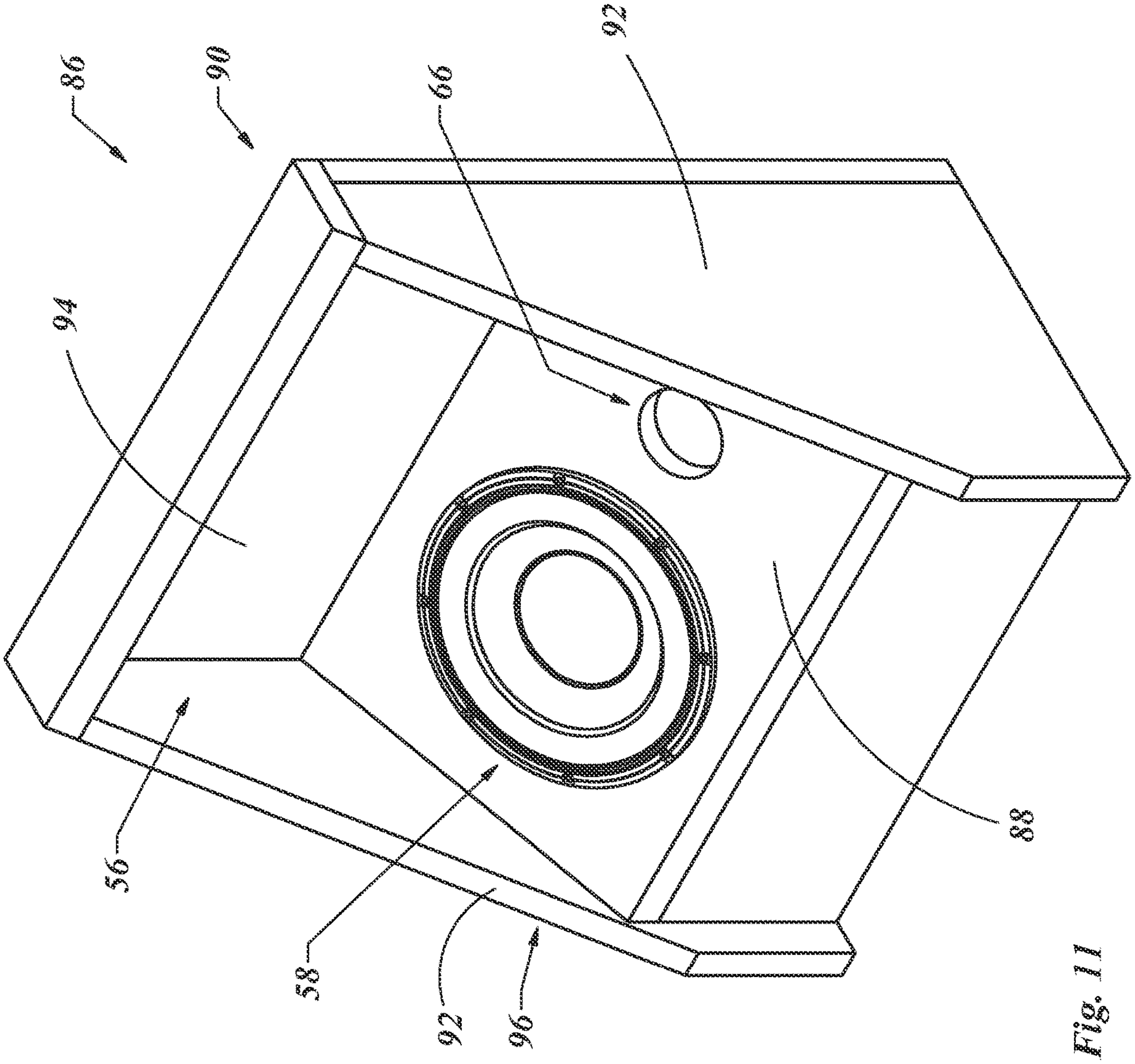
FIG. 11 is an isometric view of a bass coupler device for use with a media chair.

An alternative embodiment of the present invention is shown in FIGS. 11-24. In these figures an existing chair, sofa or any number of other types of furniture may be used in conjunction with a bass coupler 86 to achieve similar results as with the media chair 30 as previously disclosed. FIG. 11 shows a bass coupler 86 with a speaker 58 mounted to a speaker support 88, which may be housed within a box frame 90. The speaker support 88 may include a vent port 66 positioned adjacent to the speaker 58 as previously shown and described. The box frame 90 may include a pair of sidewalls 92 and a back wall 94, the combination comprising a front chamber 56, which may assist in producing a plenum area when the speaker 58 produces sound energy. The box frame 90 may include an open end 96, which may be placed adjacent to a chair or other furniture where a user may be seated. This combination may extend the plenum area to the user sitting in the chair, in a manner as previously disclosed.

Figure 12:
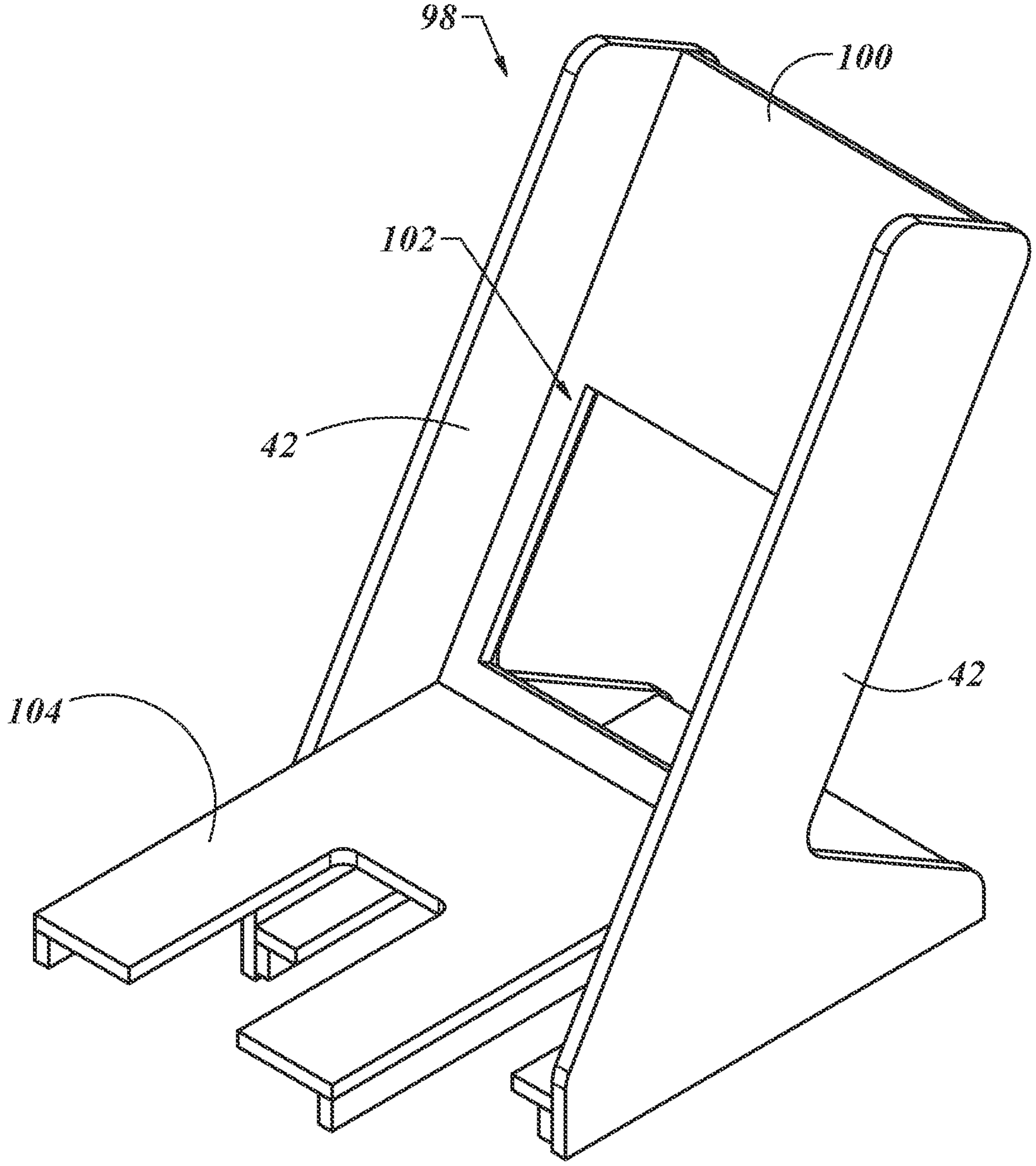
FIG. 12 is a front isometric view of a frame for a media chair to be used with the bass coupler device of FIG. 11.
Figure 13:
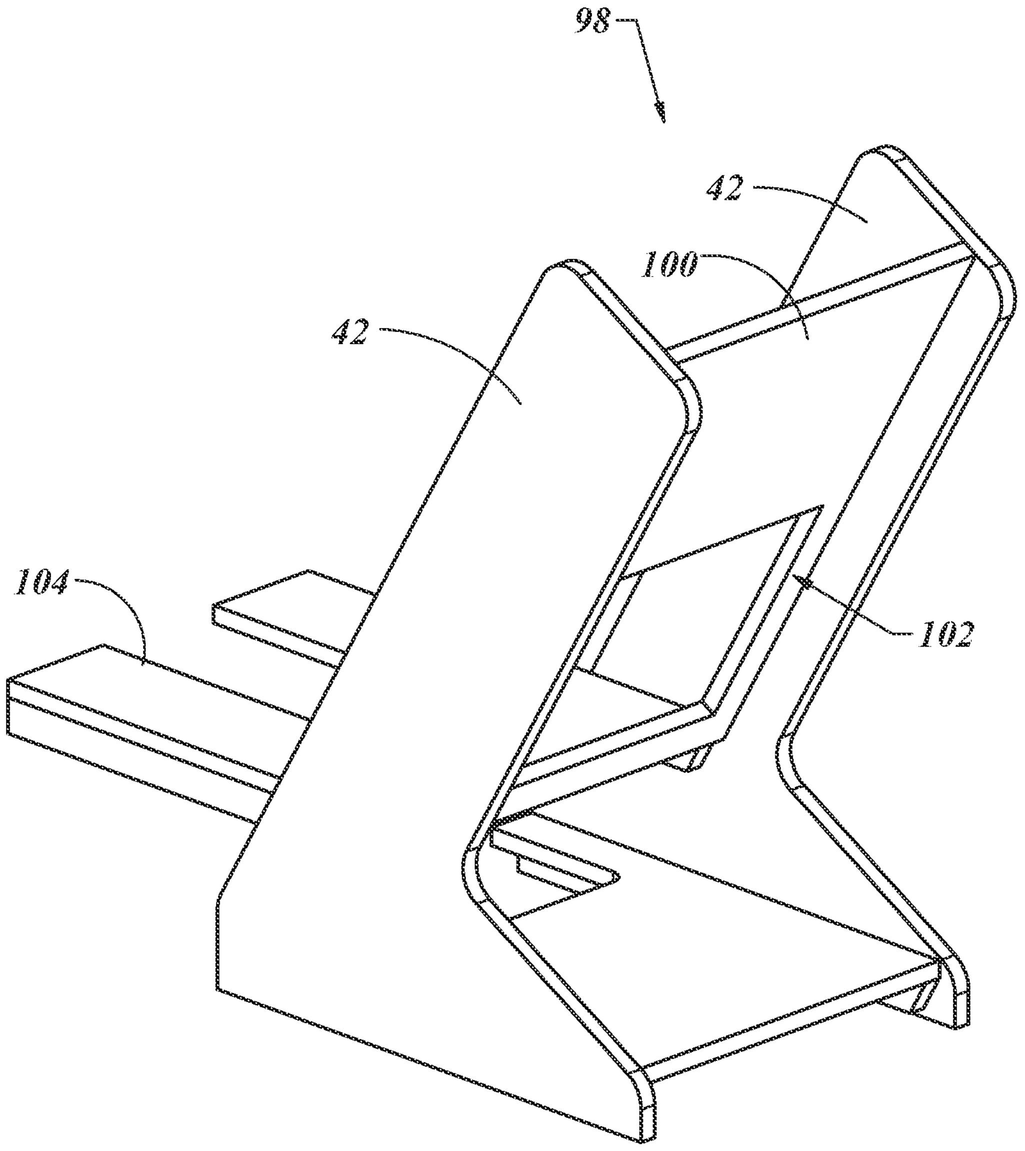
FIG. 13 is a rear isometric view of a frame for a media chair to be used with the bass coupler device of FIG. 11.
Figure 14:
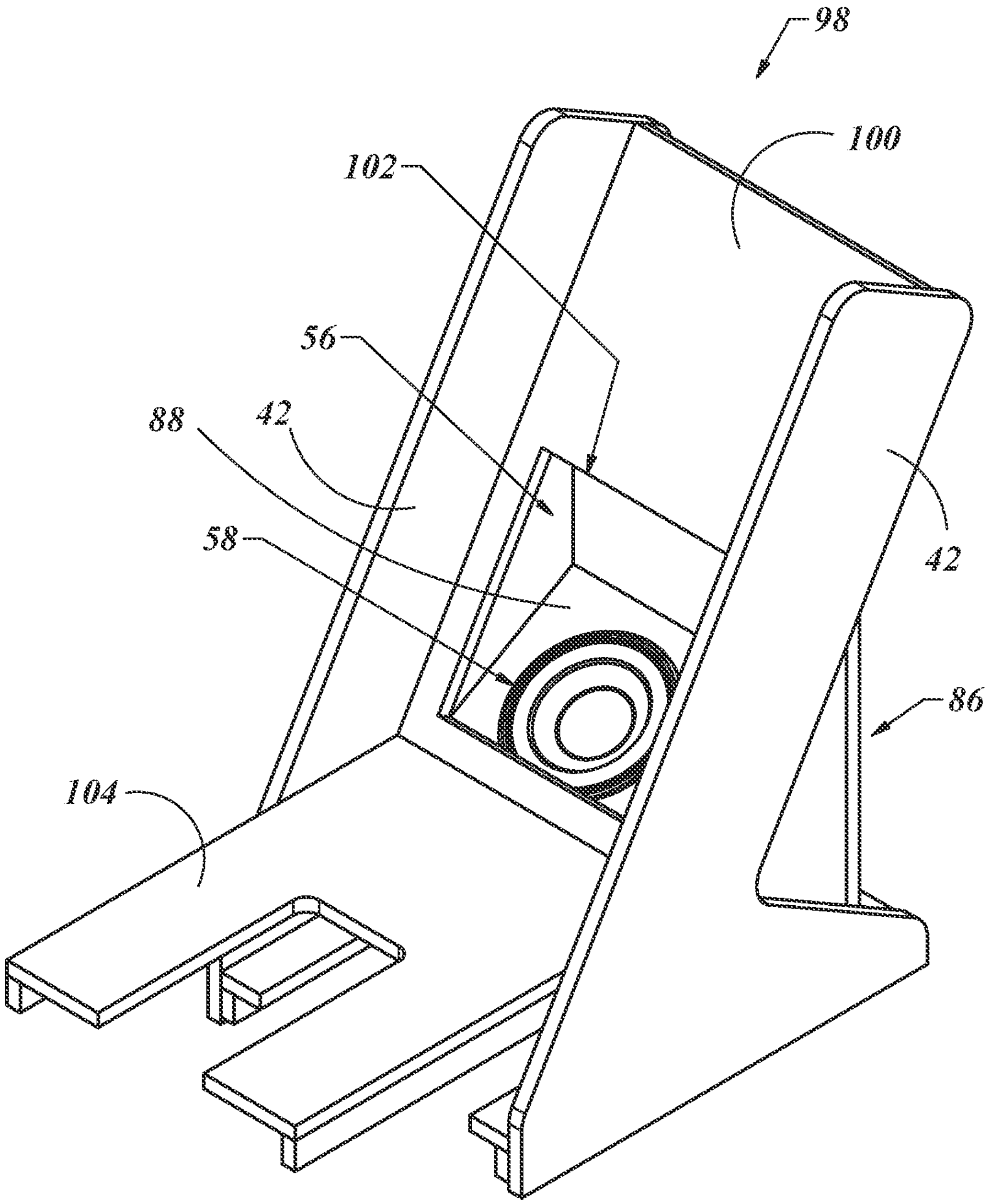
FIG. 14 is a front isometric view of a frame for a media chair with the bass coupler device of FIG. 11 incorporated therein.
Figure 15:
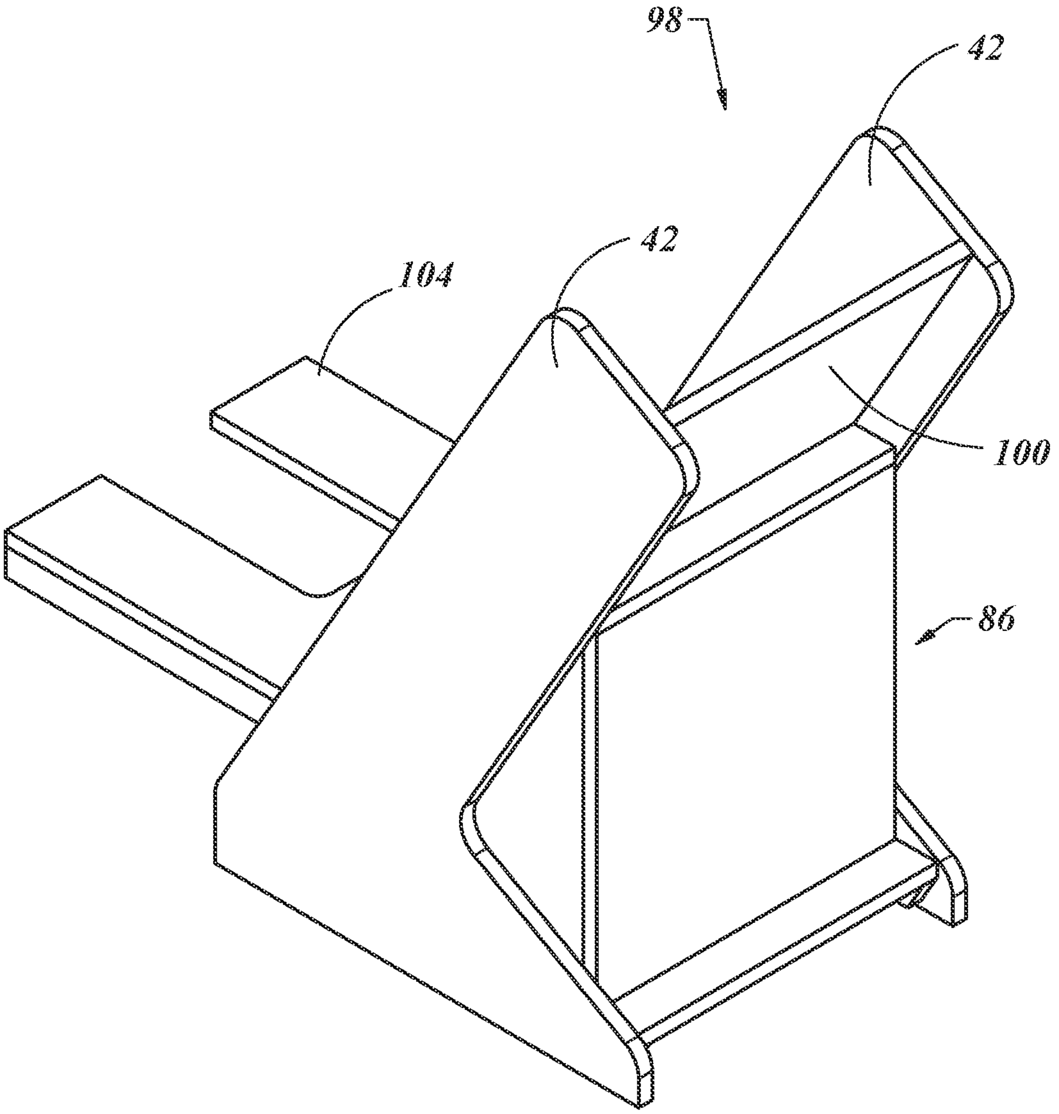
FIG. 15 is a rear isometric view of a frame for a media chair with the bass coupler device of FIG. 11 incorporated therein.
Figure 17:
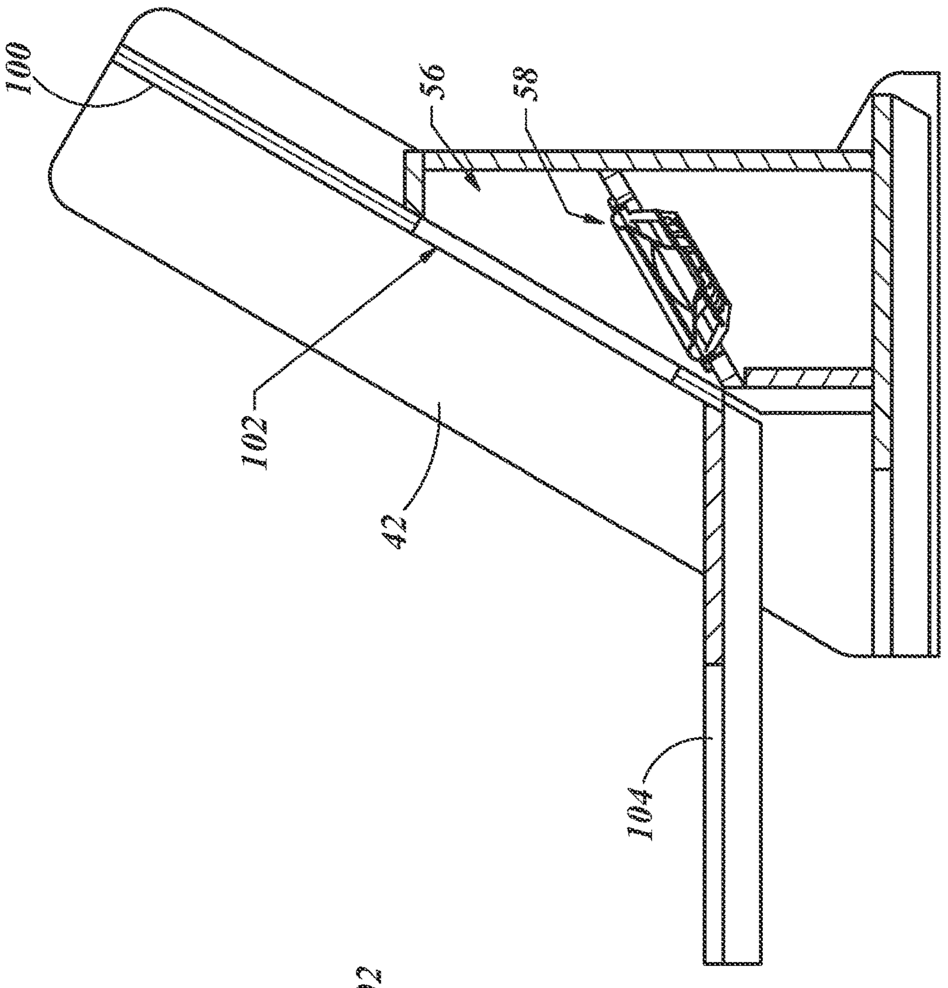
FIG. 17 is a side sectioned view of the frame for the media chair of FIG. 16 and cut along section line 17-17.
Figure 16:
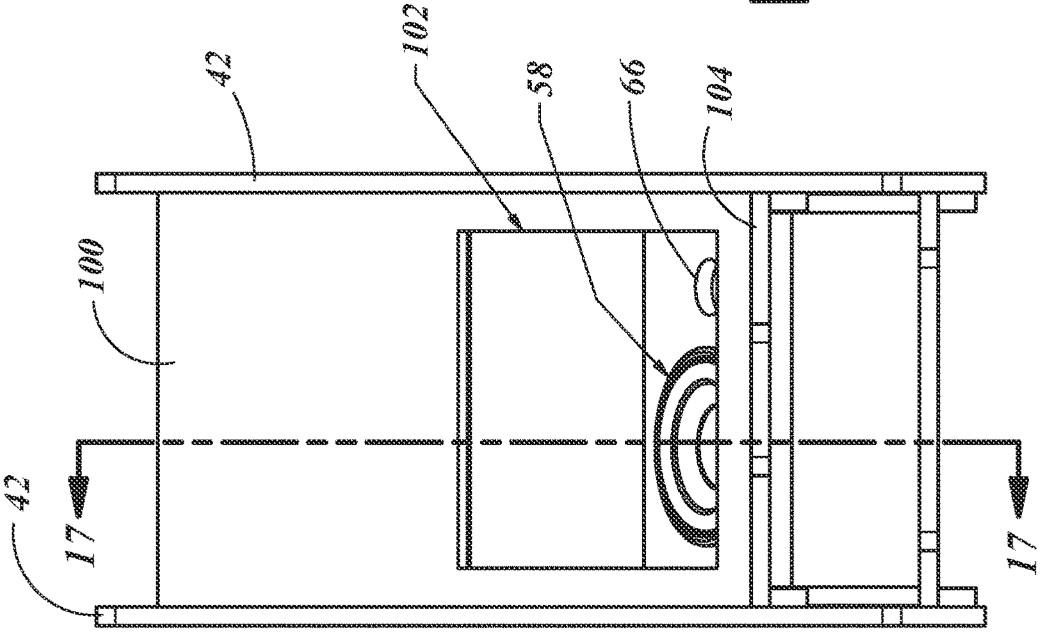
FIG. 16 is a front view of the frame for a media chair of FIG. 14 showing the location of section line 17-17.
Figure 18:
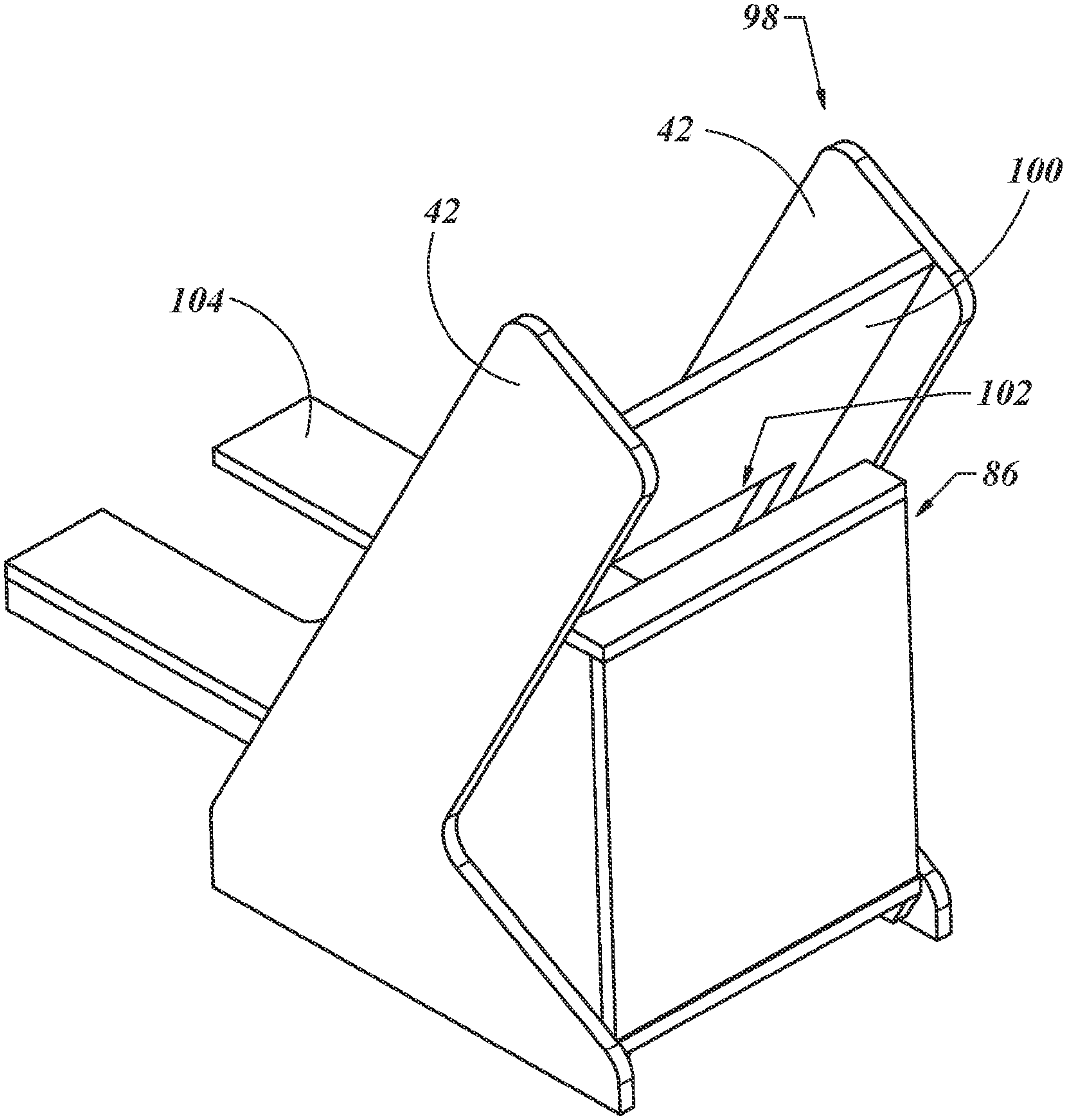
FIG. 18 is a rear isometric view of the frame for the media chair of FIG. 14 with the bass coupler device slightly displaced from the rest of the chair frame.
Figure 20:
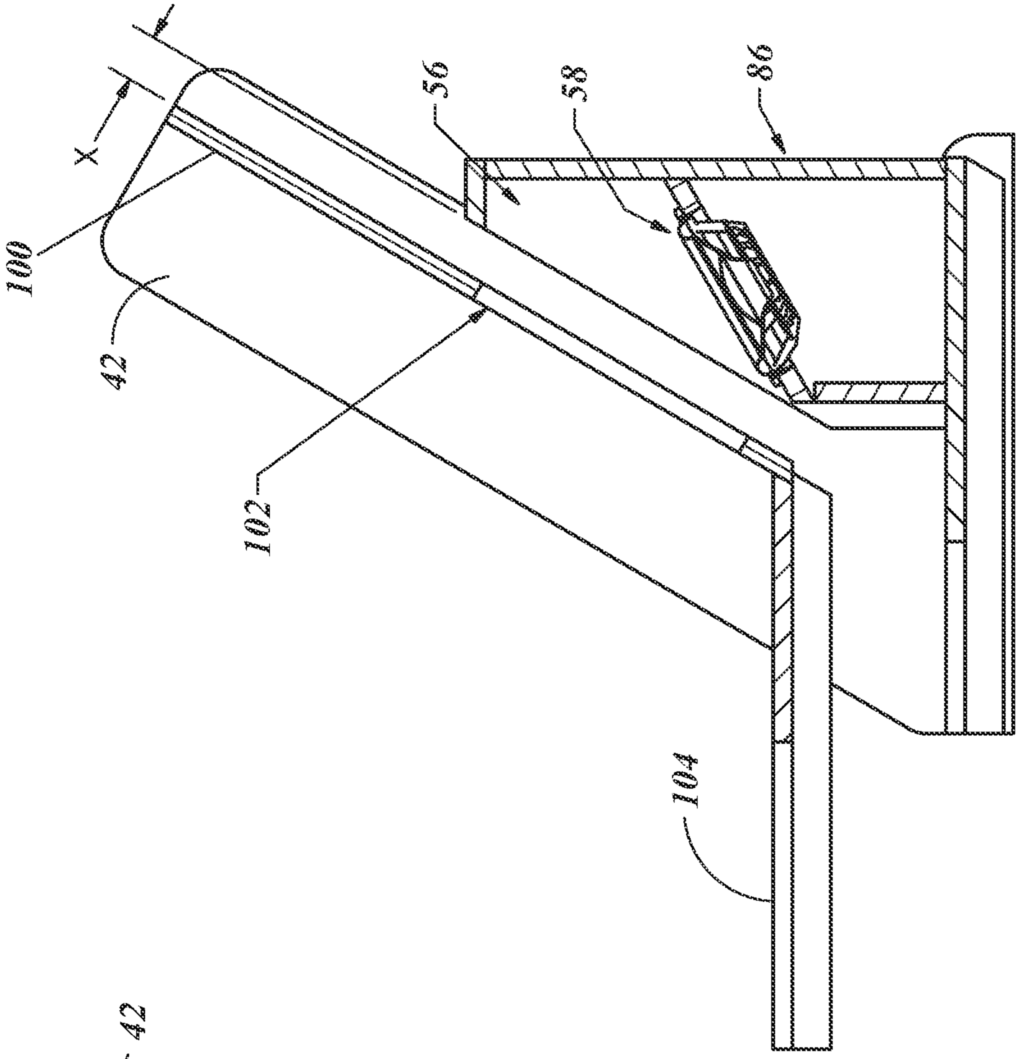
FIG. 20 is a side sectioned view of the frame for the media chair of FIG. 19 and cut along section line 20-20 showing the displacement of the bass coupler from the frame and noted by the dimension "x".
Figure 19:
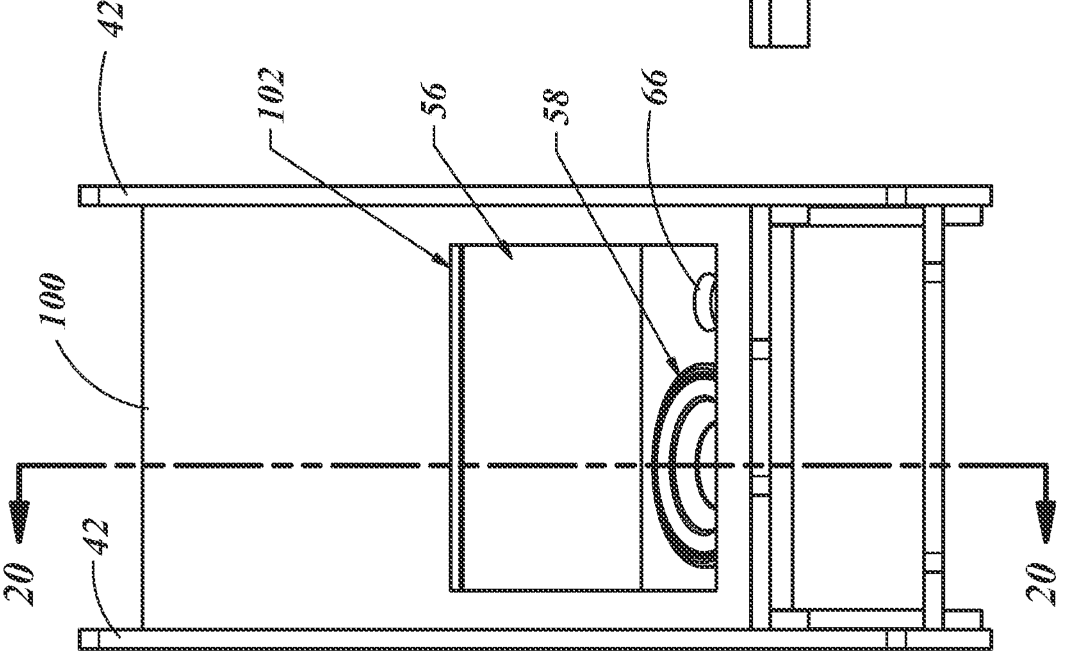
FIG. 19 is a front view of the frame for a media chair of FIG. 18 showing the location of section line 20-20.
Figure 21:
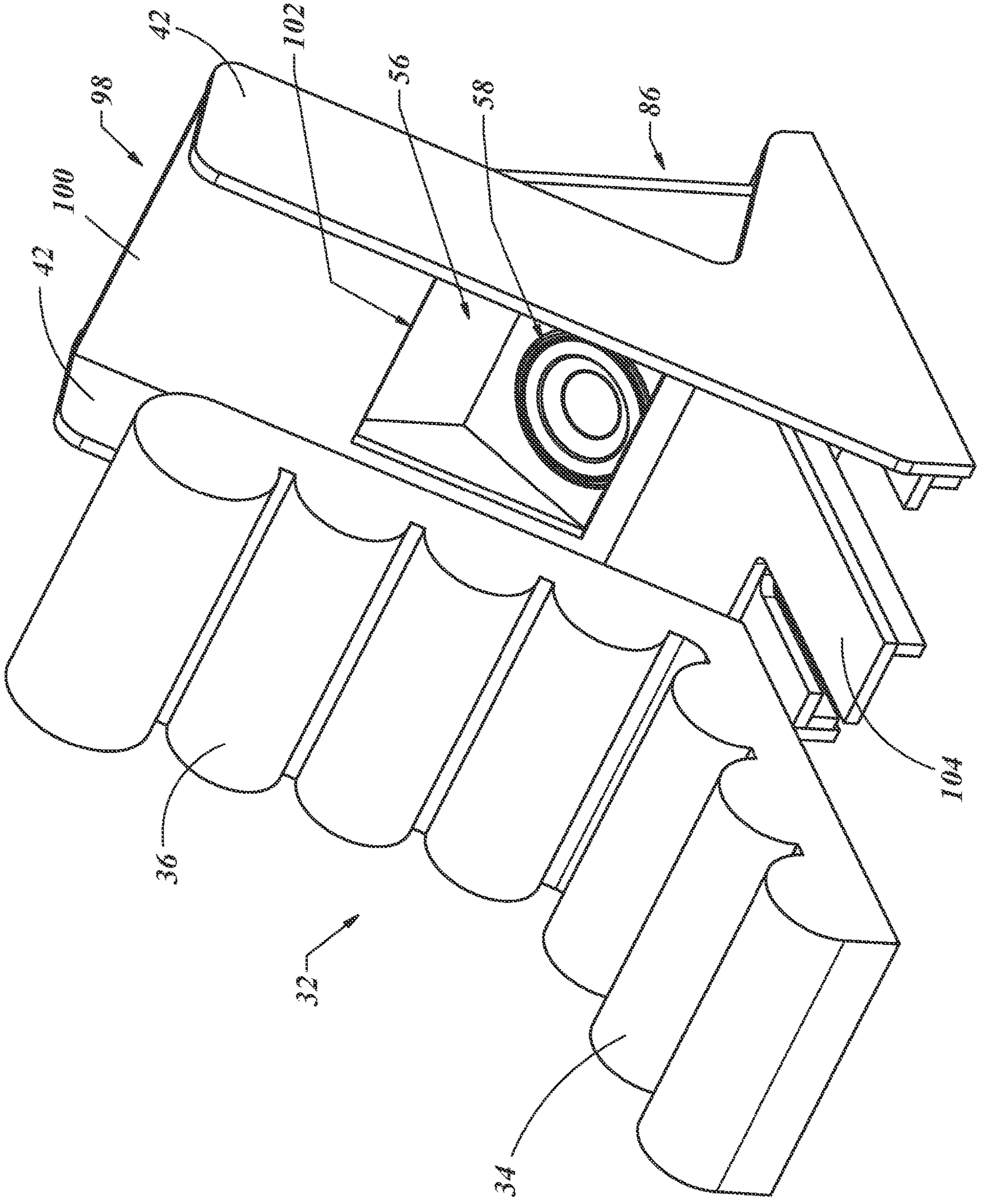
FIG. 21 is an isometric view of the media chair with the bass coupler of FIG. 14 with a seat cushion positioned adjacent to the chair.
Figure 22:
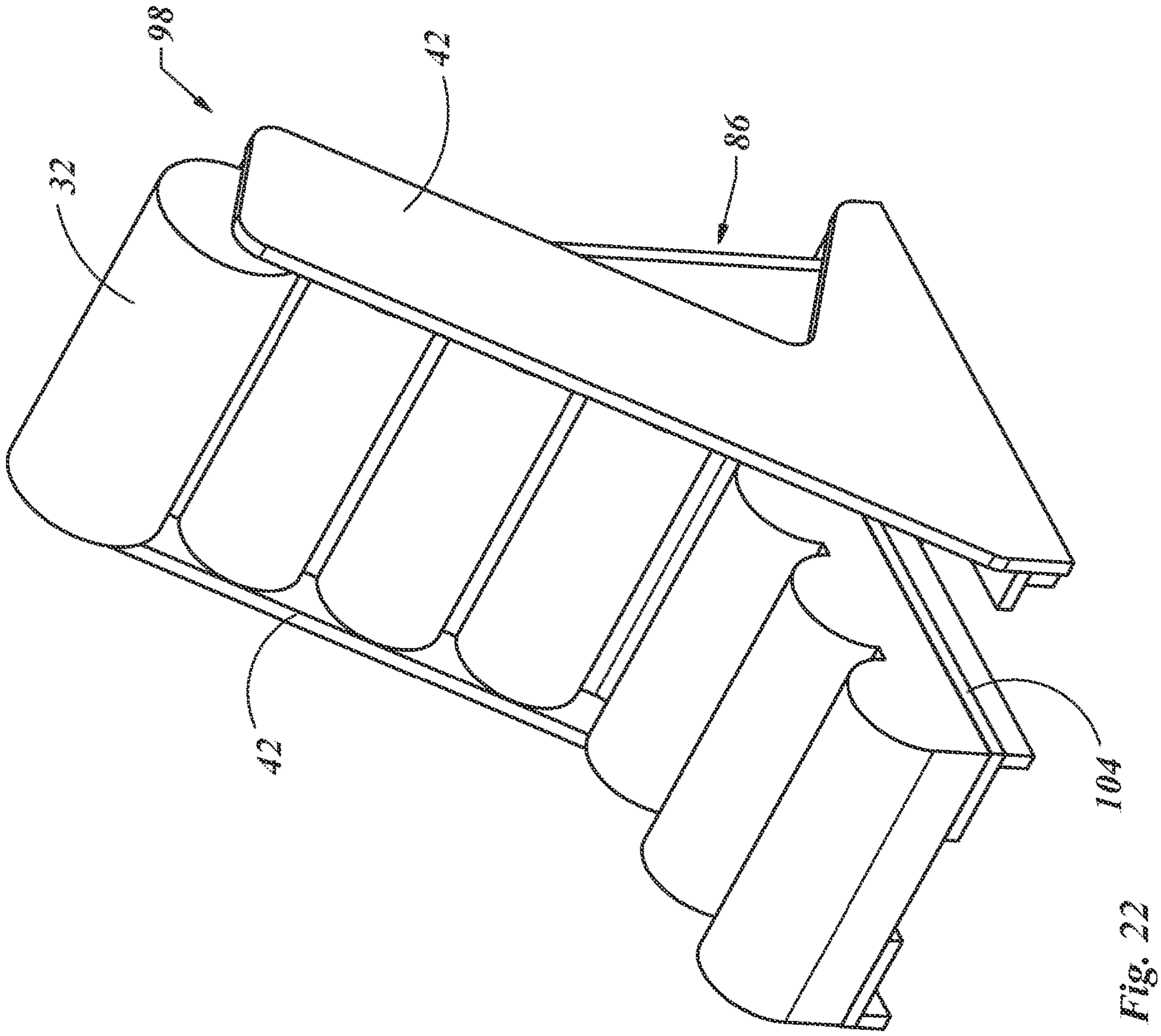
FIG. 22 is an isometric view of the media chair of FIG. 21 with the seat cushion positioned on the chair frame.
Figure 24:
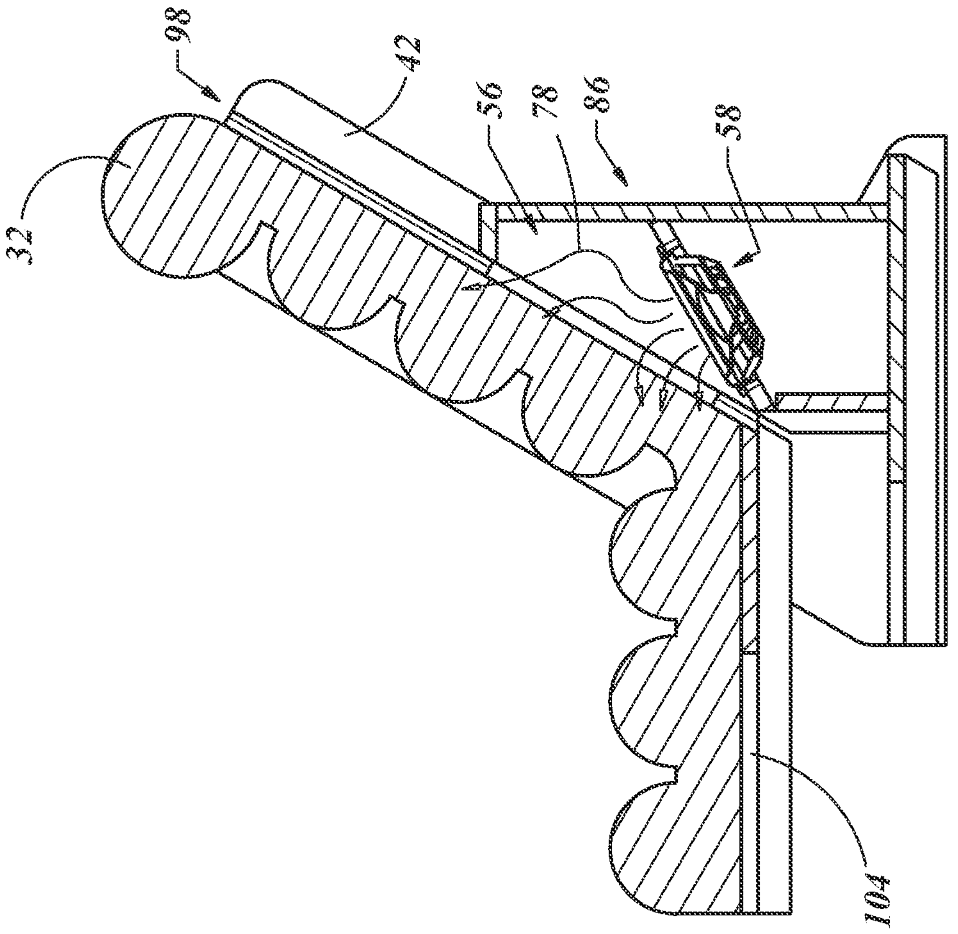
FIG. 24 is a side sectioned view of the media chair frame of FIG. 23 and cut along section line 24-24.
Figure 23:
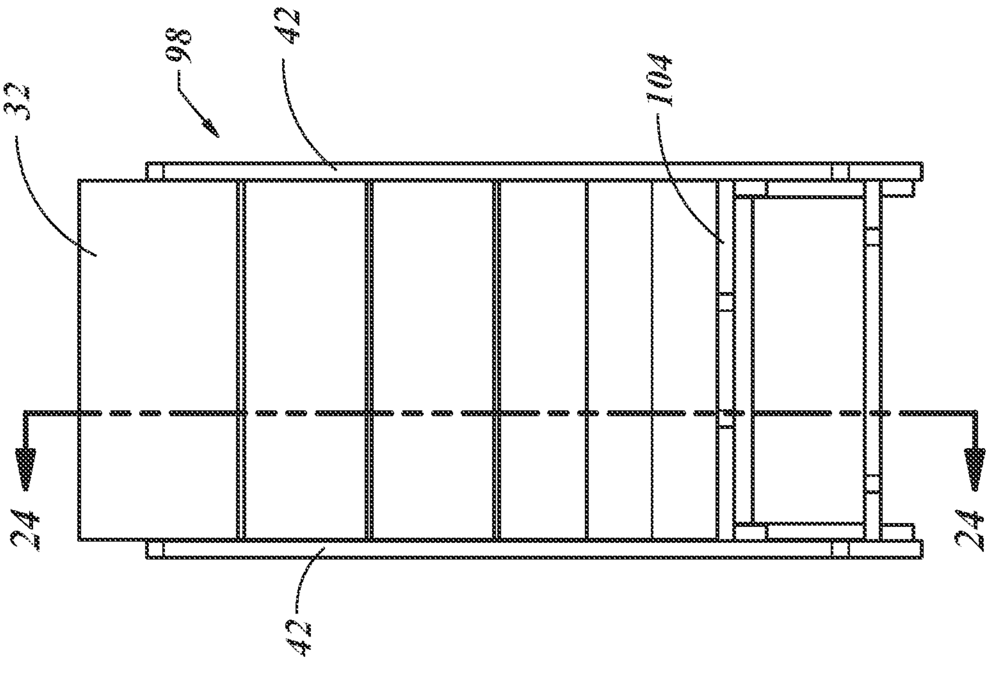
FIG. 23 is a front view of the frame for a media chair of FIG. 22 showing the location of section line 24-24.
Figure 25:
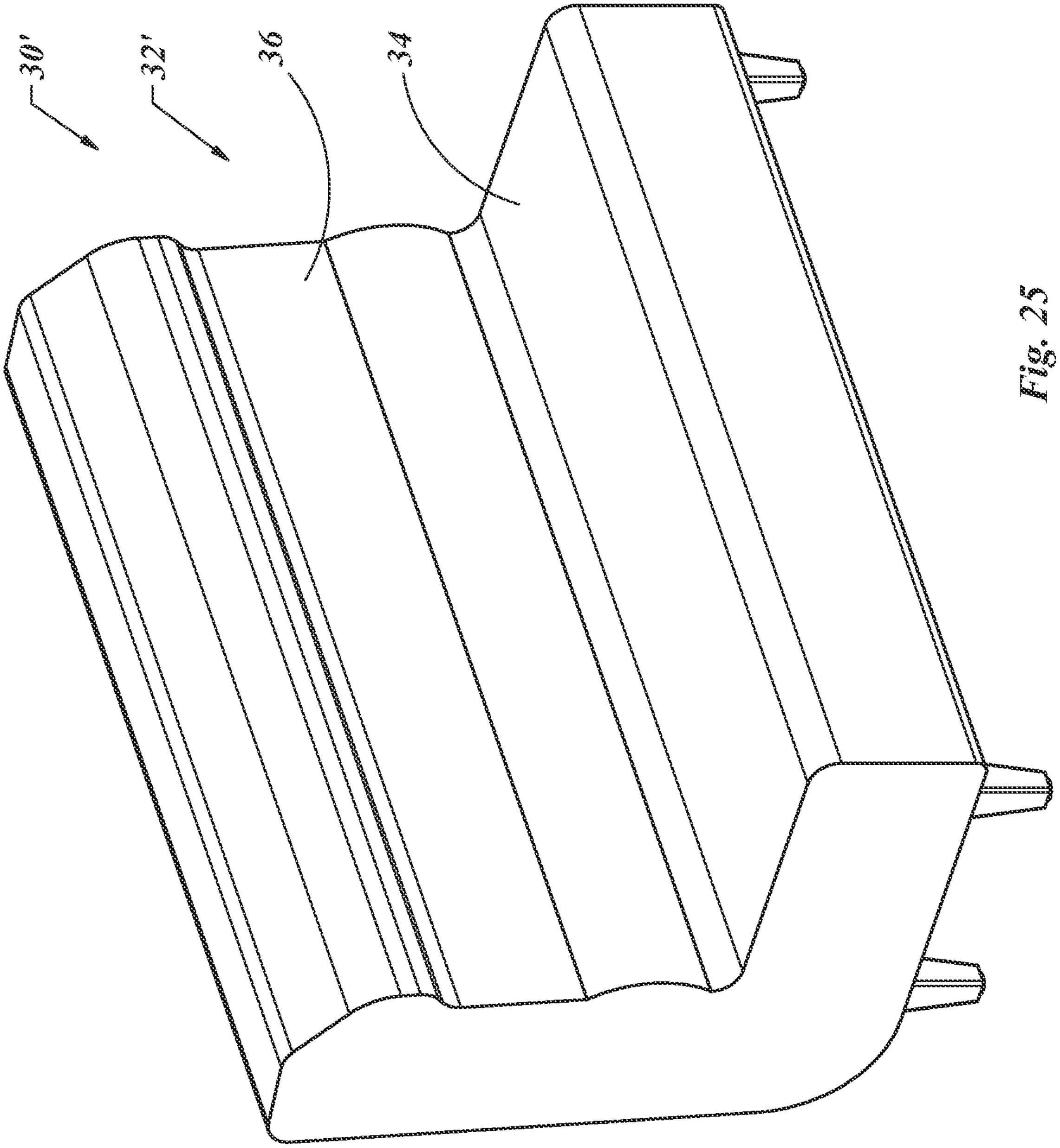
FIG. 25 is an isometric view of a media chair in the form of a sofa or other chair suitable for supporting more than one person at a time.
Figure 27:
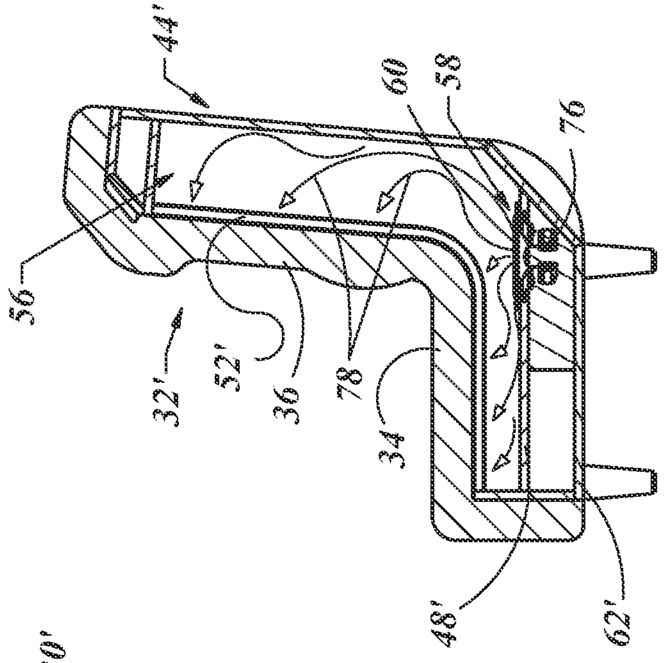
FIG. 27 is a sectioned view of the media chair of FIG. 26 cut along the section line 27-27.
Figure 26:
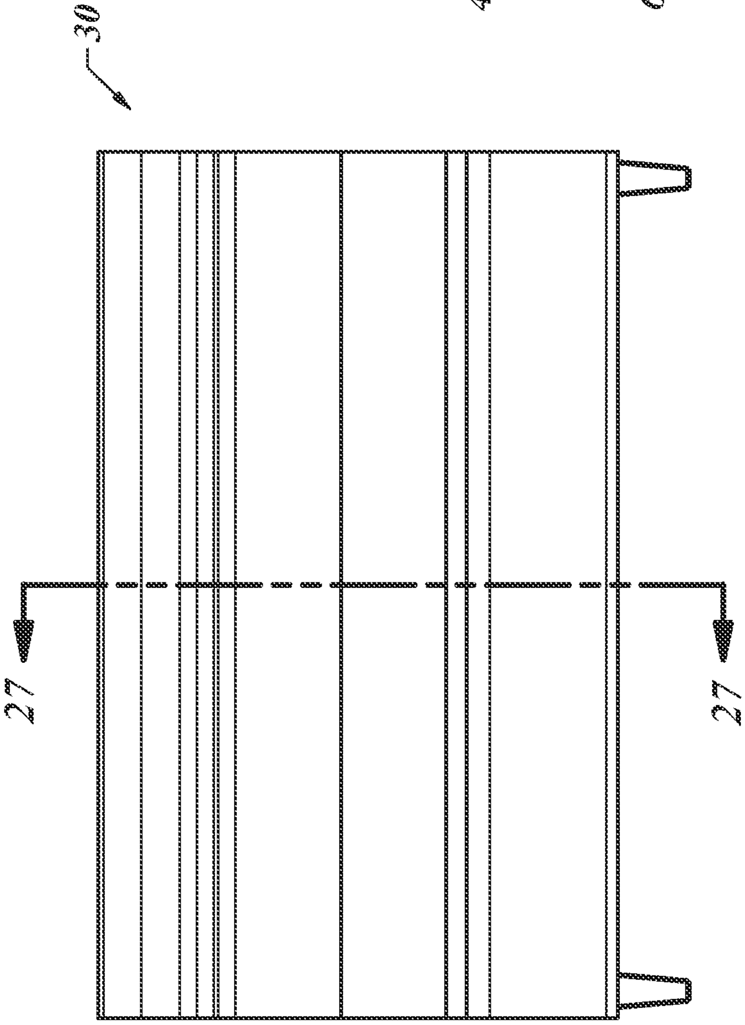
FIG. 26 is a front view of the media chair of FIG. 25.
Figure 28:
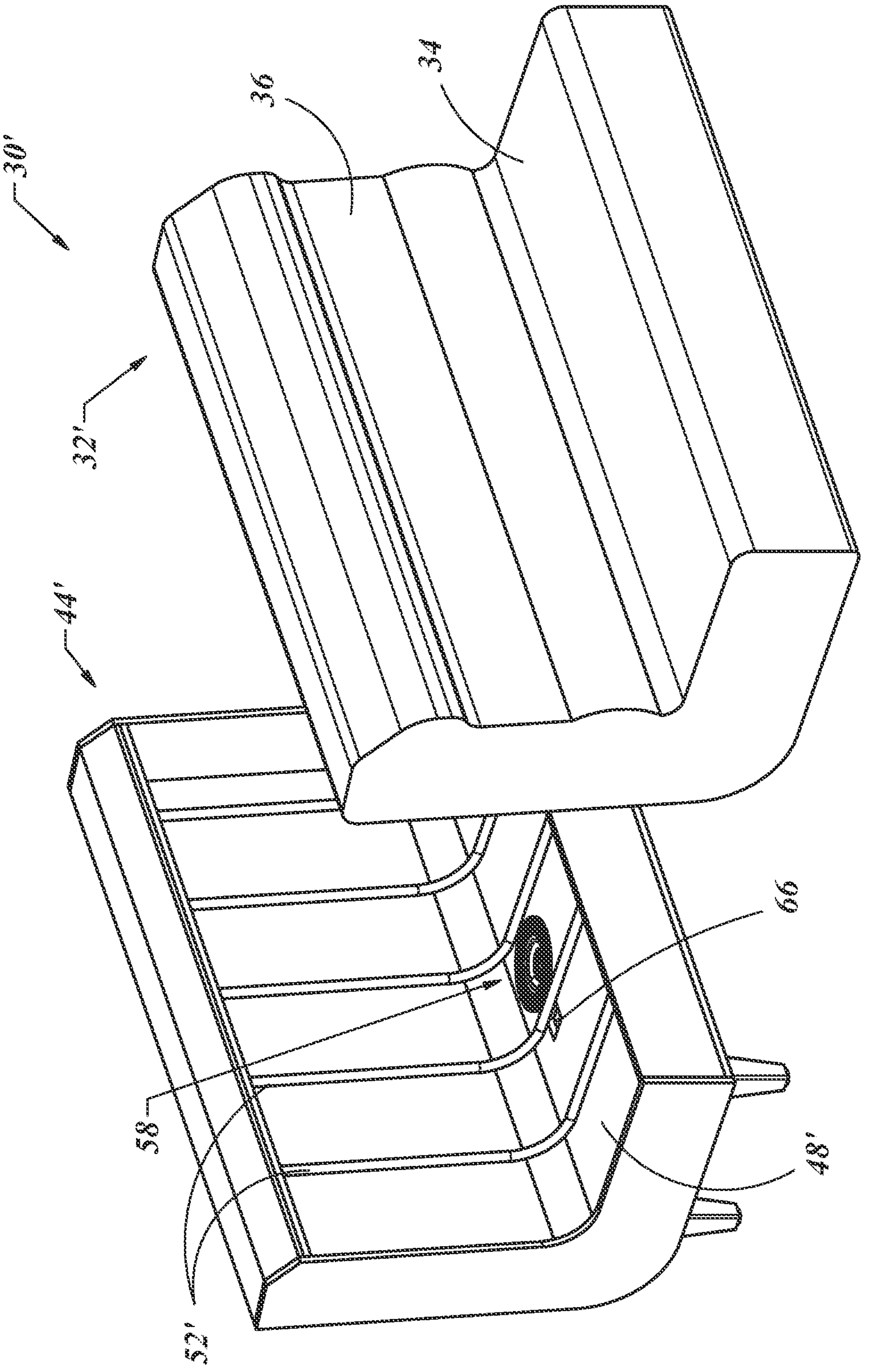
FIG. 28 is an isometric view of the media chair of FIG. 25 with the cushion displaced from the rest of the chair.

A coupler chair 98 may also be constructed in such a manner to efficiently take advantage of the directional output of the sound energy from the speaker 58 to the user seated in the coupler chair 98. An example is shown in FIGS. 12-13. The coupler chair 98 may include two side frames 42, which may be coupled to a back frame 100. The back frame 100 may include an open area 102. The open area 102 may be covered by a substantially invisible acoustic material, such as a mesh or a series of rods, in that the sound energy may pass through or around these structural elements with little or no obstruction to the sound energy. For the purposes of this disclosure the open area 102 will be depicted as a completely open section in the back frame 100. A seat base 104 may also be provided, such that the combination of the seat base 104 and the back frame 100 may support a seat cushion 32 and a user on that cushion 32.

In FIGS. 14-17 the bass coupler 86 has been positioned in the coupler chair 98 such that the front chamber 56 of the bass coupler 86 is adjacent to and substantially aligned with the open area 102 of the coupler chair 98. In this way, the front chamber 56 of the bass coupler 86 may be extended through the open area 102 of the coupler chair 98 such that the sound energy generated by the speaker 58 may pass through the coupler chair 98 and to a user seated on the coupler chair 98.

One advantage to having the bass coupler 86 being unique from the coupler chair 98 is that the bass coupler 86 may not be required to be in direct contact with the back of the coupler chair 98. This is illustrated in FIGS. 17-20. In this embodiment, the bass coupler 86 may be displaced from the back frame 100, as noted by the dimension "x". Not only may the power input to the speaker 58 be altered according to the desire of the user, but an alternative form of altering the amount of sound energy generated by the speaker 58 which would pass through the open area 102, and therefore to the user positioned on the coupler chair 98, may be to effectively "unseal" the connection between a front portion of the bass coupler 86 and the back frame 100, as shown here. By creating a space between the base coupler 86 and the back frame 100 of the coupler chair 98, a portion of the acoustic or sound energy generated by the speaker 58 may escape into the room by way of the gap provided between the bass coupler 86 and the back frame 100 of the coupler chair 98. This energy loss into the room would then not be directed through the open area 102 of the back frame 100 of the coupler chair 98, and therefore not be transferred to the user seated in the coupler chair 98.

As previously noted, a seat cushion 32 may be provided on the coupler chair 98. This is illustrated in FIGS. 21-24. The seat cushion 32 may take a variety of forms, but is shown here to include a seat bottom 34 and a seatback 36. The seat bottom 34 may be supported by the seat base 104 and the seat back 36 may be supported by the back frame 100. The seat cushion 32 may be comprised of the material that allows sound energy to pass through with minimal interference. As such, the front chamber 56, through the open area 102, may be in direct contact with a portion of the seat cushion 32. The sound energy, as illustrated by the gas pressure lines 78 may be directed toward the seat cushion 32 and therefore to the user positioned on the seat cushion 32. This embodiment shows the plenum area as generated by the speaker 58 to be positioned near the middle back of the seat back 36. This is only one possibility and could also be positioned in any number of other locations including the seat bottom 34, as shown in previous embodiments.

In some cases more than one user may be positioned on a single media chair 30'. One example of this is shown in FIGS. 25-28. A seat cushion 32' may be elongated as compared to the previous embodiments, but the seat cushion 32' may still include a seat bottom 34 and a seat back 36, as previously disclosed. The media chair 30' may include a seat frame 44' with a speaker 58 positioned such that the speaker cone 60 may be directed toward the front chamber 56. As previously shown and described, the front chamber 56 may include an area behind the seat cushion 32'. The seat cushion 32' may be supported by one or more seat supports 52'. In this embodiment, a series of seat supports 52' may be shown as structural elements coupled to the seat frame 44' and positioned adjacent to the seat cushion 32', in this instance, supporting the seat back 36 and the seat bottom 34 of the seat cushion 32'.

One or more speakers 58 may be positioned within the seat frame 44'. In this embodiment, the speaker 58 may be coupled to the bottom frame support 48' at substantially the center portion of the bottom frame support 48'. A vent port 66 may be located adjacent to the speaker 58, thereby facilitating airflow between the front chamber 56 and the speaker body 76.

The speaker 58 may produce a plenum in the front chamber 56, for which the sound energy, or sound pressure, illustrated by the gas pressure lines 78, may be directed toward the seat cushion 32' and therefore the one or more users seated on the seat cushion 32'. This may be due to the minimal resistance to energy flow of the sound energy in the direction of the seat cushion 32' as compared to the substantially closed structure on the backside of the seat frame 44' and seat base 62'. As previously disclosed, this may increase the sound energy passed to the user, or users and do so in a more efficient manner as compared to placing a speaker somewhere else in the room and further removed from the users.

Figure 29:
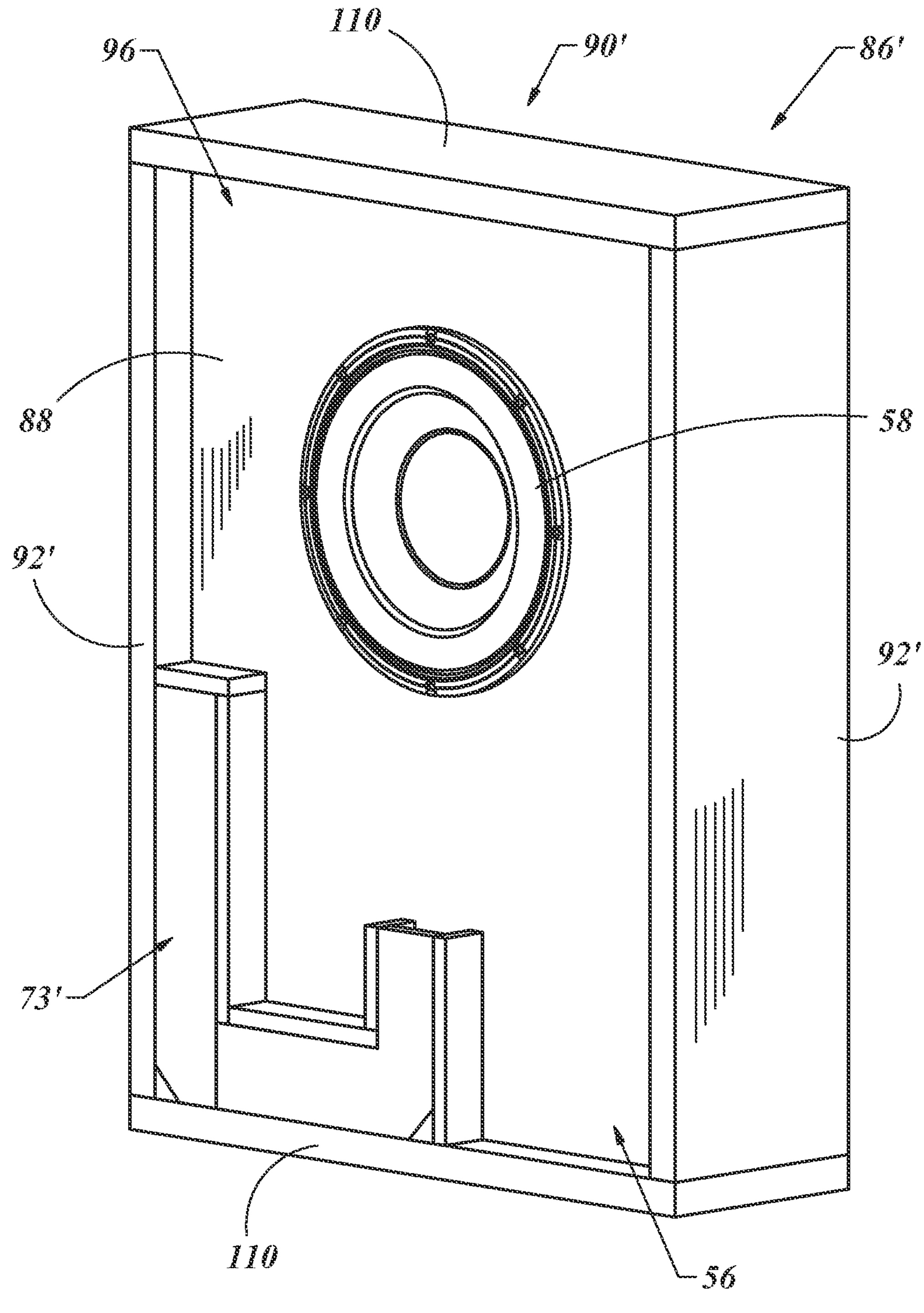
FIG. 29 is an isometric view of a bass coupler speaker produced in accordance with the present invention.
Figure 31:
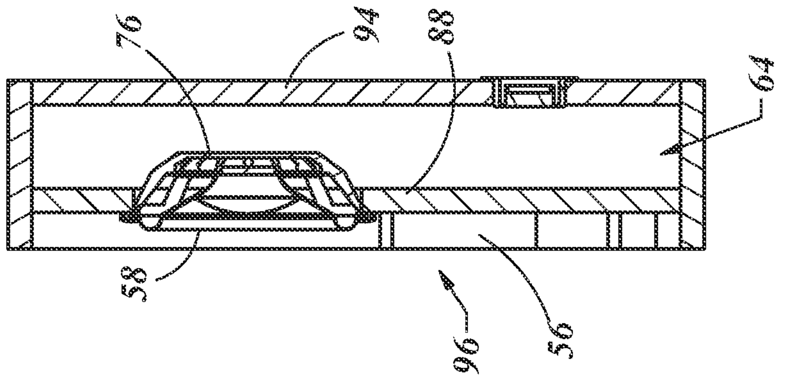
FIG. 31 is a section view cut along line 31-31 of FIG. 30.
Figure 30:
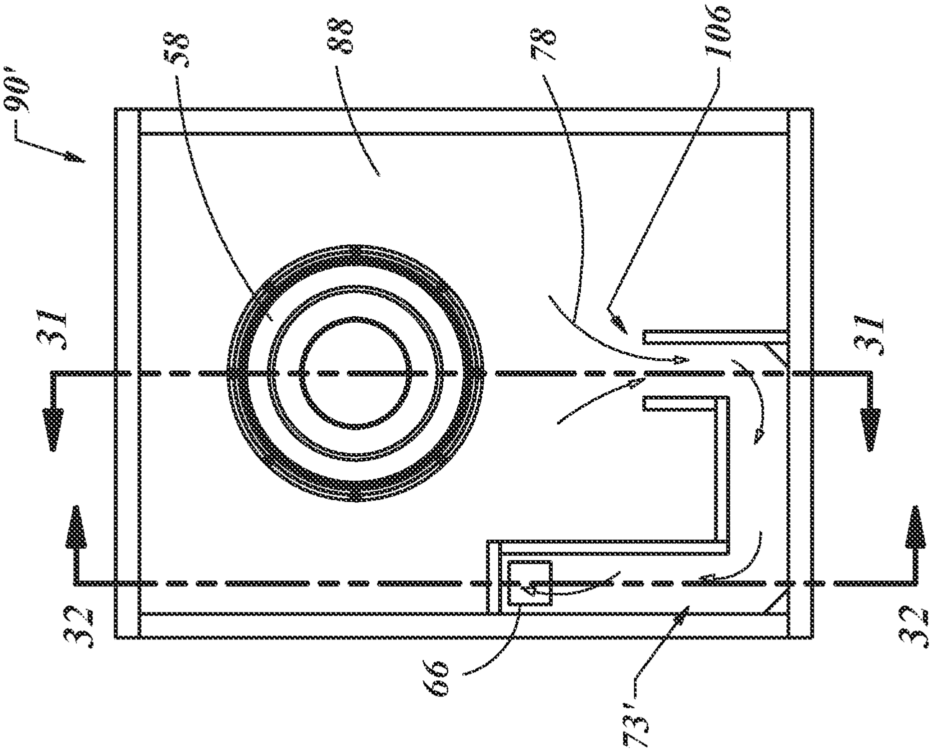
FIG. 30 is a front view of the speaker of FIG. 29 shown with the front covers of the port duct removed.
Figure 32:
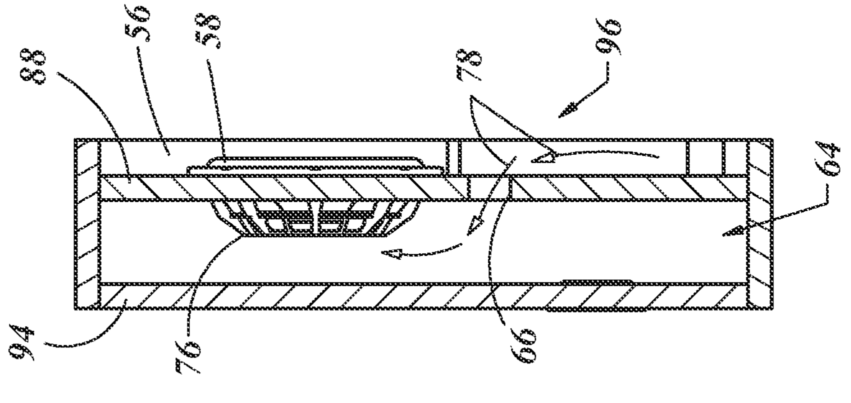
FIG. 32 is a section view cut alone line 32-32 of FIG. 30.
Figure 34:
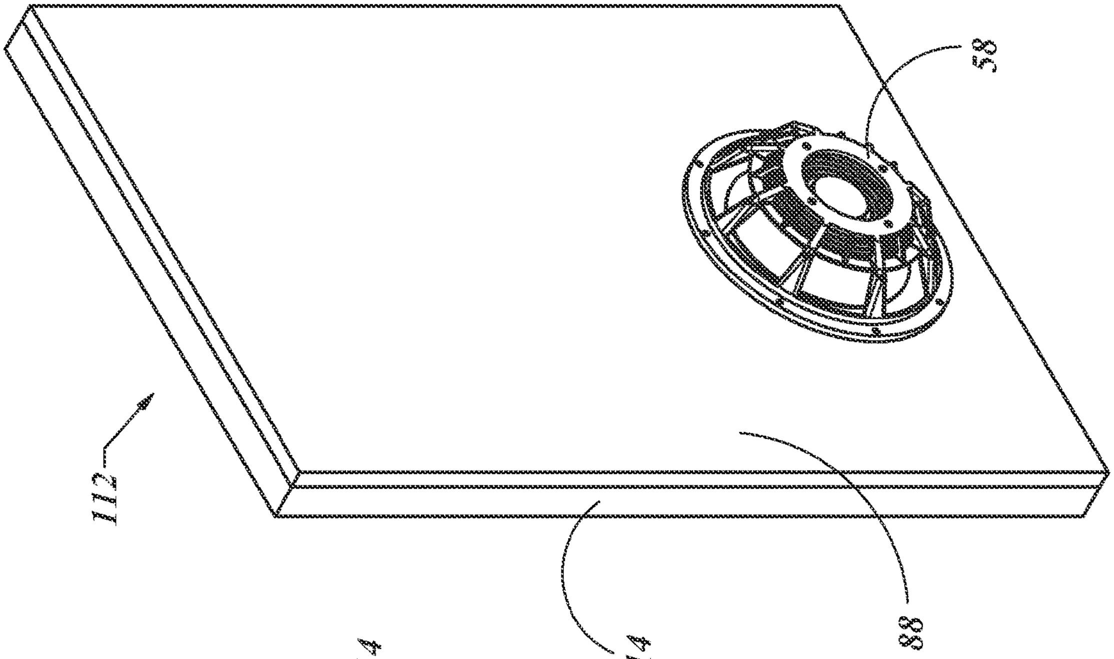
FIG. 34 is a left rear orthogonal view of the speaker as shown in FIG. 33.
Figure 33:
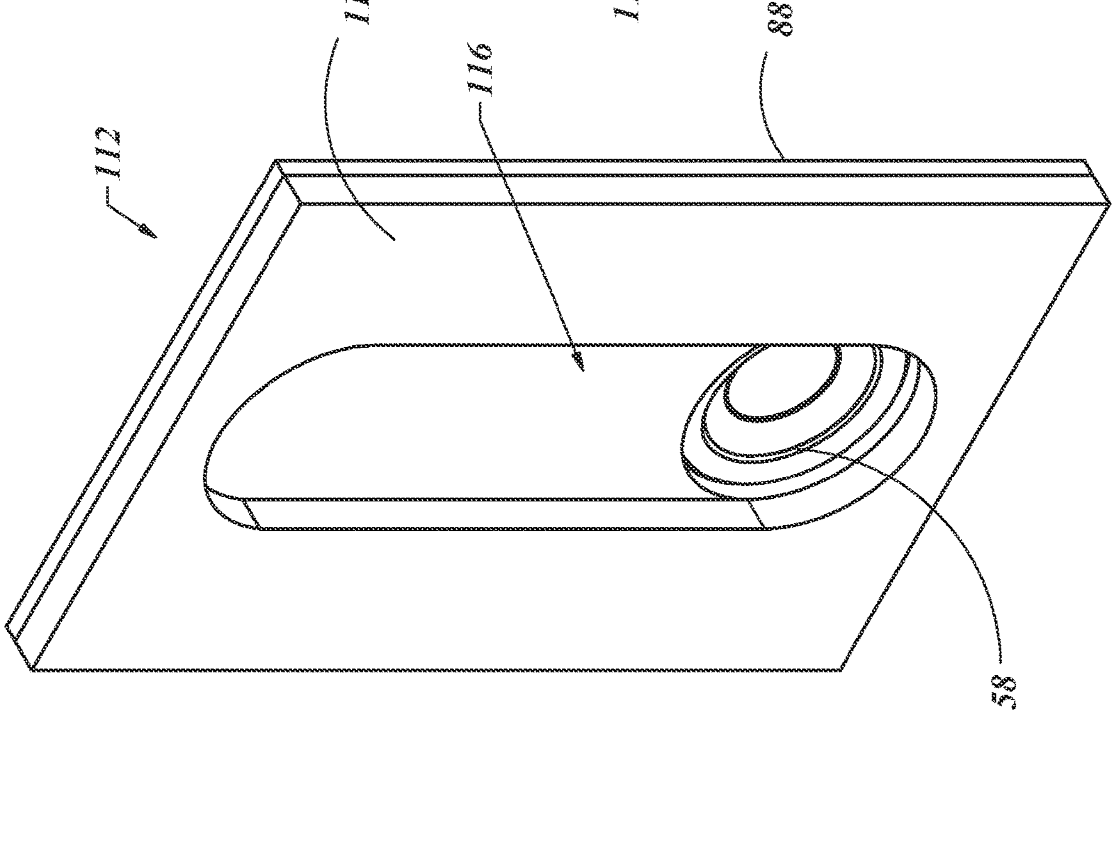
FIG. 33 is a right front orthogonal view of an alternative version of the invention wherein the back of the speaker is open.
Figure 36:
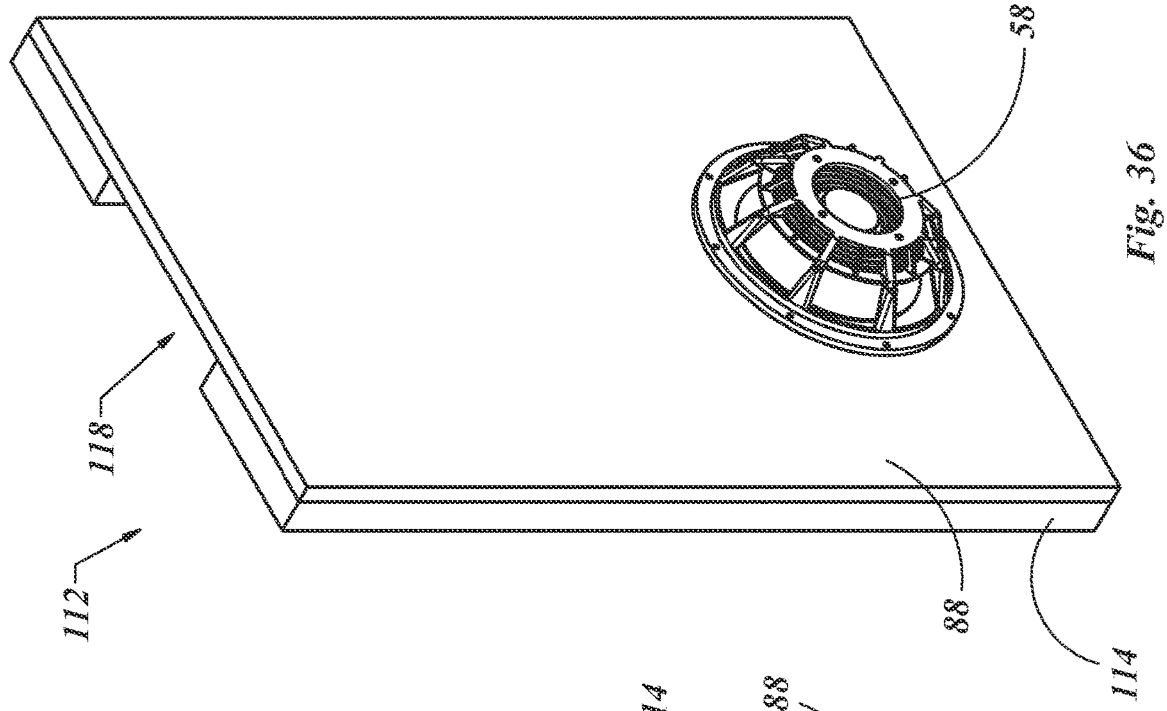
FIG. 36 is a left rear orthogonal view of the speaker in FIG. 35.
Figure 35:
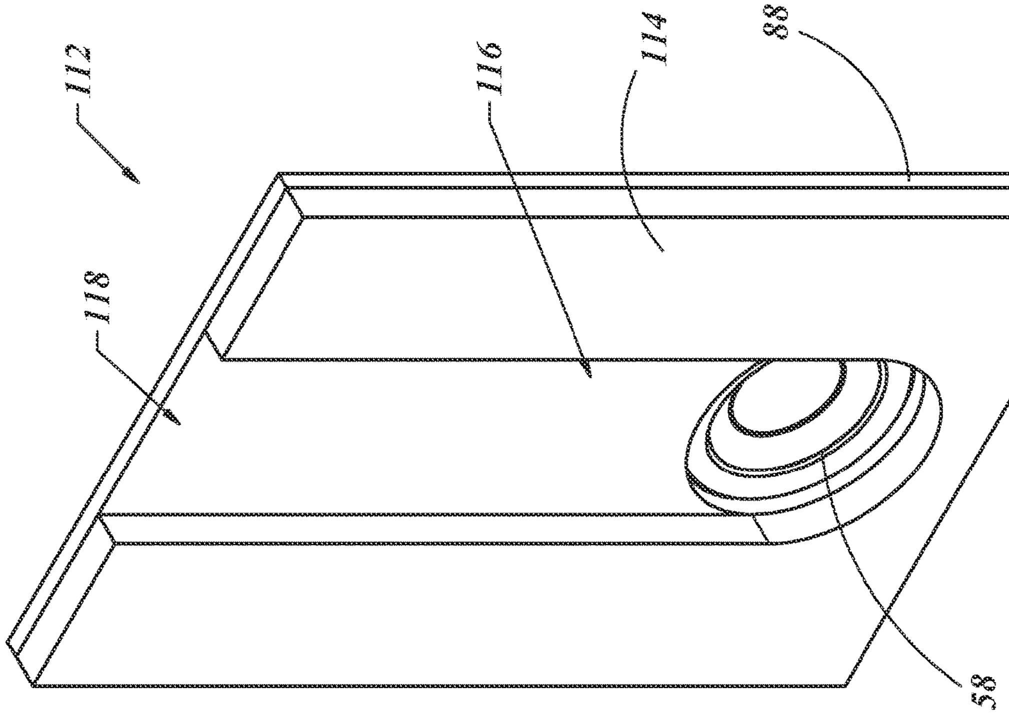
FIG. 35 is a right front orthogonal view of the speaker in FIG. 33 with a vent at the top of the open portion.

An alternative embodiment of the bass coupler 86' is shown in FIG. 29. The version of the bass coupler 86' may be more compact and less complex to manufacture as compared to the bass coupler 86 as shown in FIG. 11. The version as shown in FIG. 11 may be used to connect to a specific type and construction of coupler chair 98, as shown in FIGS. 12-24. The alternative version of the bass coupler 86' may be positioned in many locations including on or near the back or outside of any chair, furniture, bed. The bass coupler 86' may be mounted under the seat cushion of a chair, or even placed in a backpack or even coupled directly to the user. The bass coupler 86' can also be inserted inside any type of furniture. The bass coupler 86' is shown in a basic rectangular shape, however, it can also be designed in any shape including circular, round, etc. As long as the open end 96 of the front chamber 56 is positioned toward the user, be that the back, lower hip area, under the legs or any other location, the transfer of sound energy produced by the speaker 58 in the front chamber 56 may be experienced by the user.

Detail of this alternative embodiment of the bass coupler 86' is shown in detail in FIGS. 29-32. The box frame 90' of the bass coupler 86' may support the speaker 58 by way of the speaker support 88. The port duct 73' may be arranged as a truncated "U" shape in which an intake port 106 may be positioned directly below the speaker 58. The port duct 73' may funnel sound energy, as illustrated by the gas pressure lines 78, from the intake port 106 around to the side of the speaker support 88 and upward proximate to a side of the speaker 58 to the vent port 66. This may allow a portion of the high pressure gas to cycle back to the back side of the speaker 58 to the back chamber 64. Behind the speaker body 76 portion of the speaker 58, the back wall 94 may be used to help direct the sound energy, which passed through the vent port 66, to be used by the speaker 58 in the back chamber 64. The box frame 90' may include a pair of side walls 92' and a pair of end walls 110, each extending beyond the speaker support 88 to define the front chamber 56. In a preferred embodiment the volume of the back chamber 64 may be approximately twice that of the volume of the front chamber 56.

With reference to FIGS. 33-36, an alternative preferred embodiment of a speaker assembly 112 is shown. In the previous embodiments, a back chamber 64 was utilized in which the back of the speaker 58 was enclosed by the box, to create a speaker box, which aided to envelope the speaker 58. Enclosing the back of the speaker 58 has some advantages or disadvantages, depending on the intended goal. The sound pressure waves generated out of the back of the speaker 58 may be substantially equal to, but 180° out of phase, from the sound pressure generated from the front of the speaker 58. In an open space, with no speaker box, these sound pressure waves may cancel each other by a natural process called phase cancelation, thus reducing the sound energy that enters the room. If the goal is to fill the air with these low frequency sound waves, the previously shown embodiments, with a speaker box, may be desirable. If the intention is to direct the sound pressure to an individual user, it may be desirable to take advantage of the phase cancelation effect of a speaker 58, in which the back portion of the speaker 58 may be open to the room and not enclosed in a type of speaker box. This may enable a user to fully experience the sound energy from the front of the speaker 58 before it may be canceled by the sound energy emitted from the back of the speaker 58, thereby without disturbing other people in the area.

The previous embodiments may include a speaker support 88, as may be utilized here, to support the speaker 58. A front member 114 may be coupled to the speaker support 88. The front member 114 may include an open portion 116, which may act as a plenum, serving to direct the sound energy from the front of the speaker 58. The open portion 116 may be confined to the boundary of the front member 114, or the open portion 116 may extend beyond the size of the front member 114, thereby providing a vent 118. The vent 118 may provide the ability of some of the sound energy generated from the front of the speaker 58, that travels through the plenum defined by the open portion 116, to escape from the plenum through the vent 118. More detail of the possible benefits of the vent 118 will be discussed later in this disclosure. In these embodiments the front member 114 and the speaker support 88 are shown to be two separate structures that are connected together. This may be the optimal method of separately manufacturing these elements of the speaker assembly 112 and then combining them together, but it is understood that a single piece of material could be manufactured that would function as both the speaker support 88 and the front member 114 together.

Figure 37:
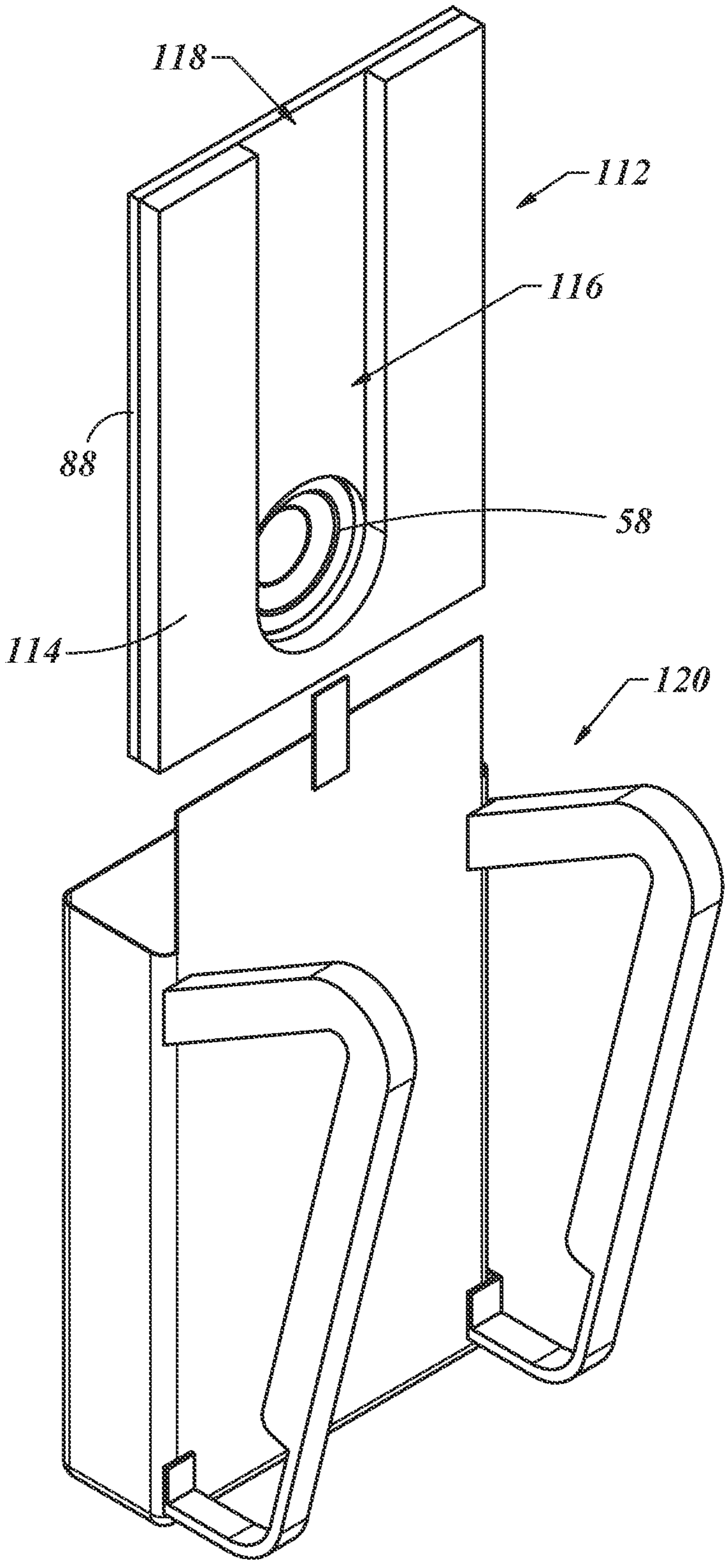
FIG. 37 is a left rear orthogonal partially exploded view of a backpack speaker assembly with the speaker shown as it may assemble into the backpack.
Figure 38:
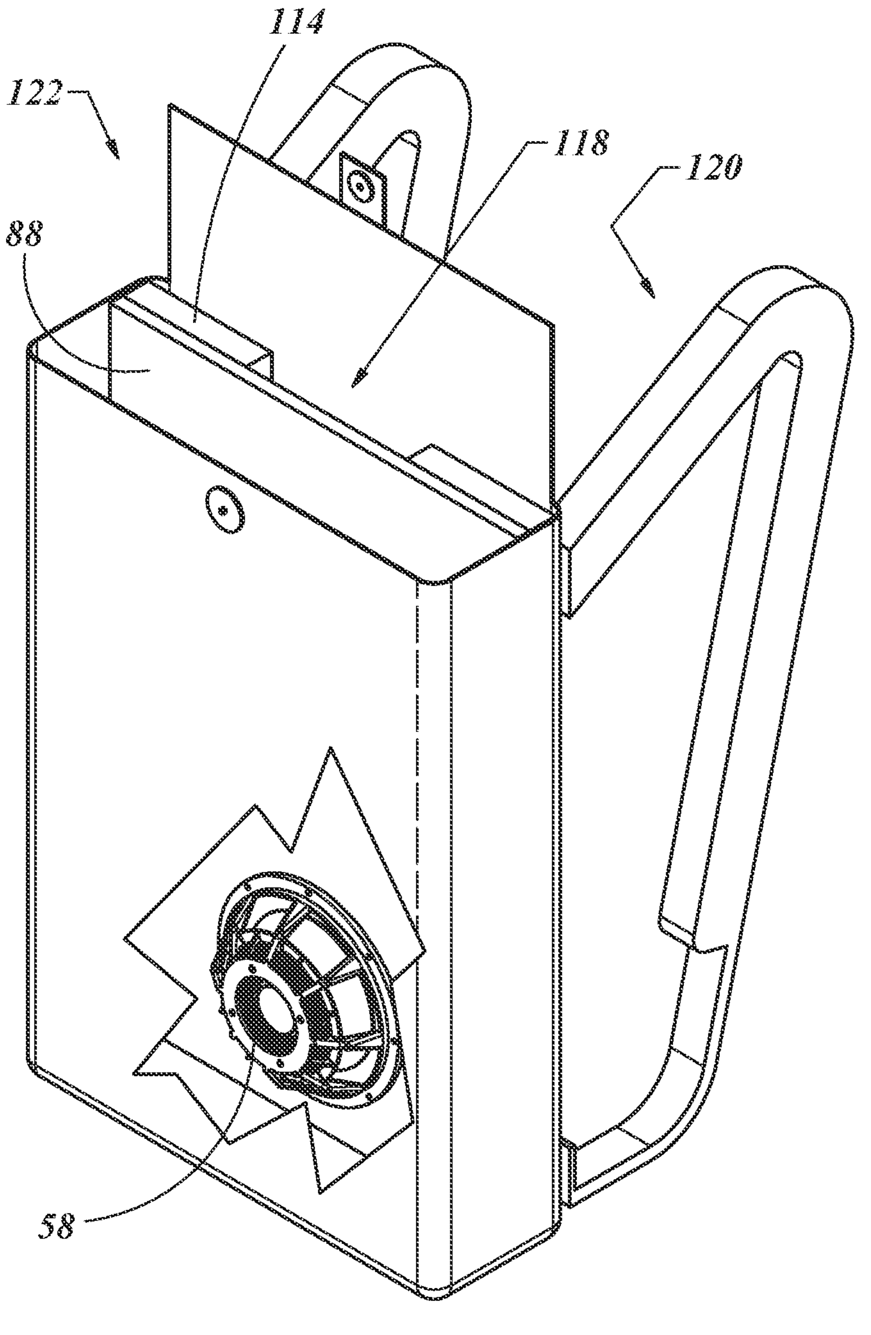
FIG. 38 is a right front orthogonal view of the backpack speaker in FIG. 37 with a portion of backpack removed to show the location of the speaker assembly in the backpack.

One application of the speaker assembly 112 may be to use it in a backpack 120. This is illustrated in FIGS. 37-38. The intended purpose of the speaker assembly 112 may be to provide a concentrated flow of sound energy to a specific user while minimizing the sound energy to others nearby. This embodiment of the backpack speaker 122 may provide an idealized example of this technology. As previously noted, sound pressure or energy generated from the back of the speaker 58 may be substantially equal to but 180° out of phase from the sound waves generated from the front of the speaker 58. If the back of the speaker 58 is not enclosed in a speaker box and these sound waves are able to move out into the immediate area, virtually unencumbered due to the absence of the speaker box, the sound may cancel the sound produced out of the front of the speaker 58 after they pass beyond the user wearing the backpack speaker 122.

This phase cancelation process may occur in the immediate area, thus minimizing any disruption to others in the area that do not want to listen to the user's music or other audio content. The user, on the other hand, may be positioned directly in front of the plenum defined by the open portion 116. With the speaker backpack 122 on the user's back, the plenum may be the thickness of the backpack material away from the user's skin. The shape of the plenum, as defined by the open portion 116, may be shaped to resemble the torso of a user, in that it may be taller than it is wide, and thus be elongate in shape. Also, the plenum may be positioned directly adjacent to the spine of the user. This may maximize the sensitivity of the user to the sound energy, thus maximizing the effectiveness of providing sound energy to the user and not to other people nearby. The plenum, as defined by the open portion 116, may be limited in width to be narrower than the width of the back of an average person. By doing so, if the user leans back against the front member 114, the user's back may be less likely to restrict the sound pressure from coming out of the open portion 116. If the back of the user "falls into" the open portion 116, this may disrupt the function of the plenum to generate pressure to distribute sound energy to the body of the user.

The vent 118 may be positioned at the top of the backpack speaker 122. The vent 118 may be used to provide a release of some of the sound pressure from the open portion 116 that may be restricted by the body of the user. In some cases the vent 118, as positioned here toward the head of the user, may also direct a portion of the sound pressure upward toward the head, and therefore the ears, of the user. This may enhance the listening experience of the user, in addition to the direct energy transferred to the back of the upper torso of the user through the plenum.

The material of the backpack 120 may be any commonly used material suitable for a backpack, such as nylon, cotton or similar pliable materials. It may be desirable that the material on at least the side of the backpack 120 that contacts the body of the user, may be made of a waterproof or water resistant material, such as nylon. Waterproof materials are likely less porous and may provide a slight backpressure between the speaker 58 and the outside of the backpack 120 in the form of the speaker backpack 122. This backpressure may cause the material of the backpack 120 in the speaker backpack 122 next to the body of the user to vibrate as a result of the sound energy produced by the speaker 58. This vibration of the material may provide an additional sensory stimulation to the user in the form of a tactile stimulation, thereby enhancing the audio experience of the user.

Figure 39:
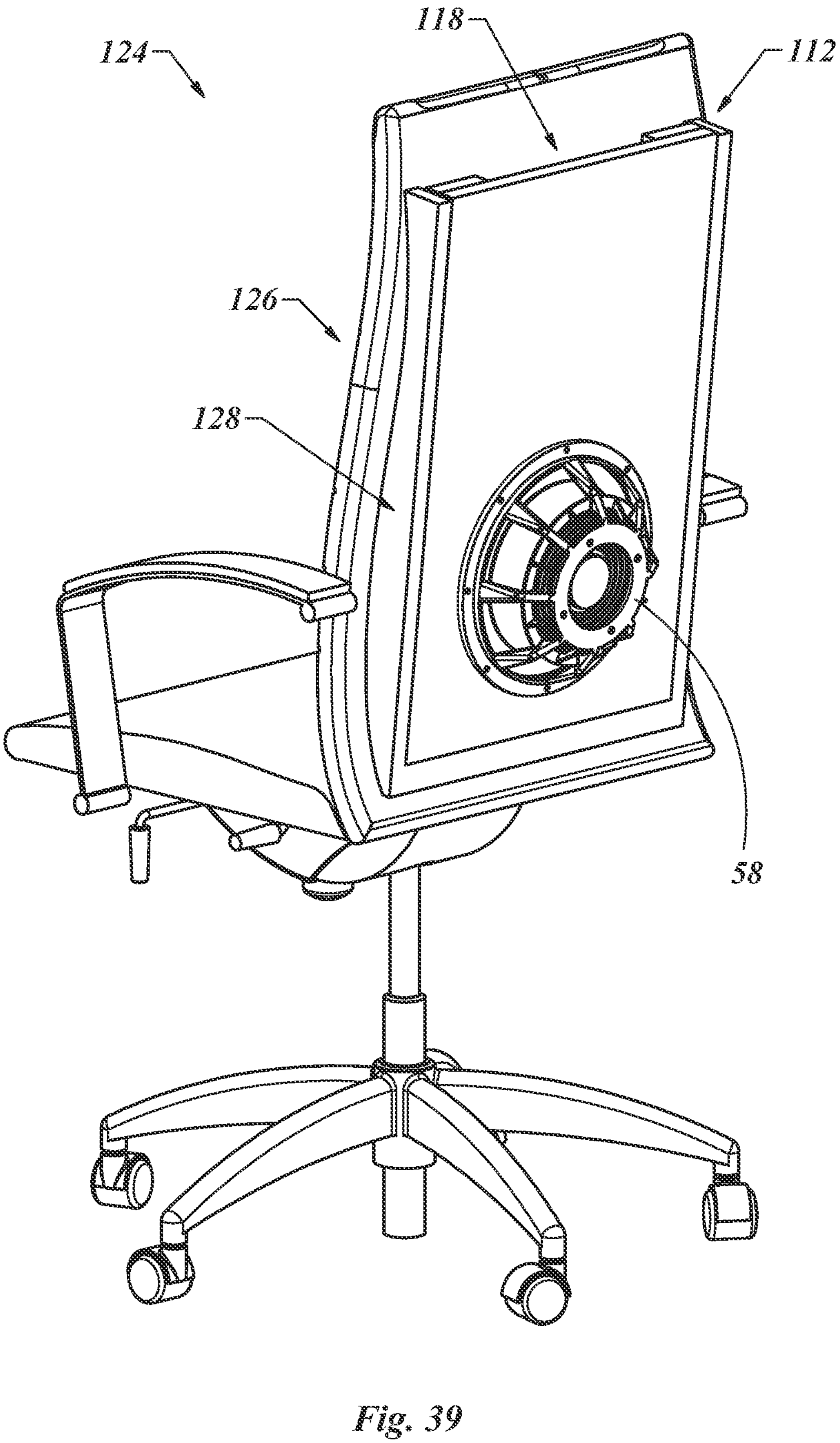
FIG. 39 is a left rear orthogonal view of a speaker chair with the speaker assembly positioned on a back portion of the chair.
Figure 41:
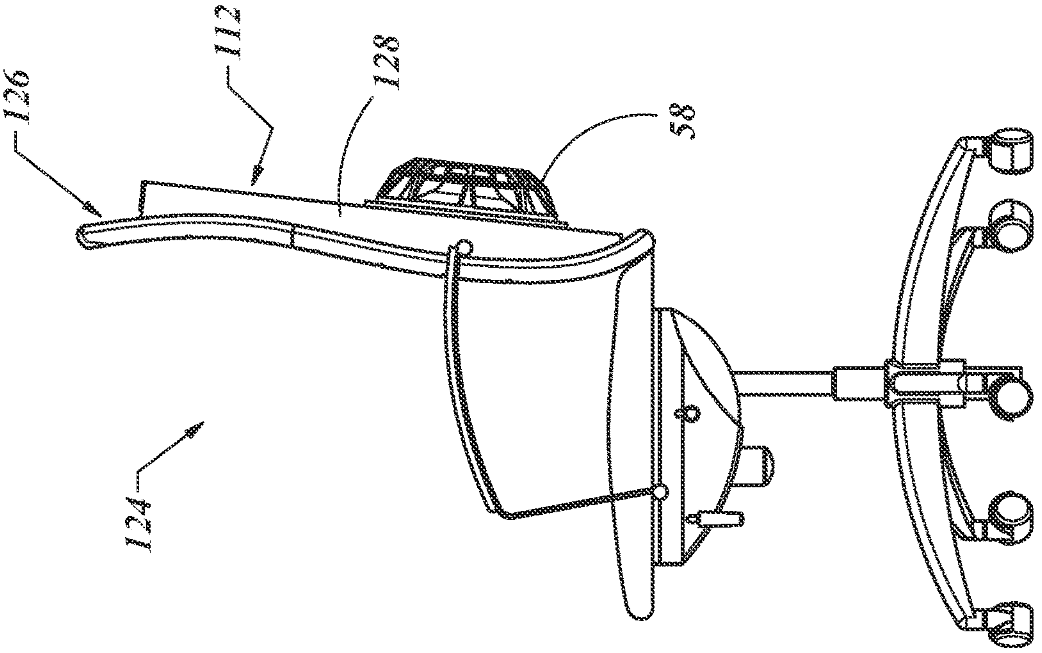
FIG. 41 is a left side view of the speaker chair shown in FIG. 40.
Figure 40:
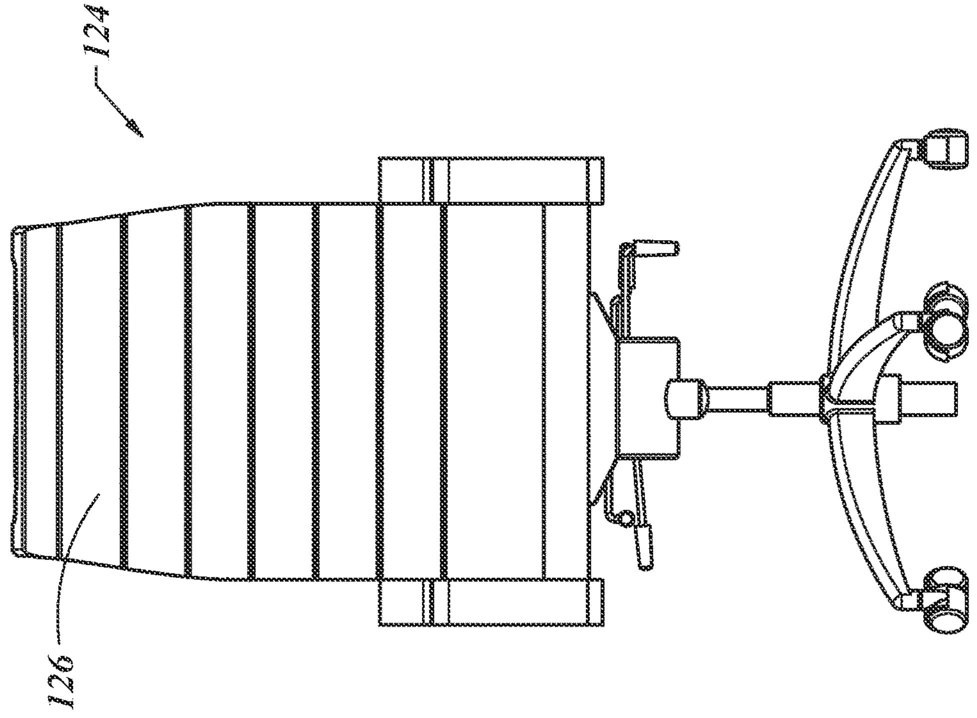
FIG. 40 is a front view of the speaker chair in FIG. 39.

In FIGS. 39-41 a chair 124 is shown with a speaker 58 as part of the speaker assembly 112 positioned in the back of the chair 124. In this embodiment the back of the speaker 58 is exposed to the room, as previously discussed with speaker assembly 112 positioned in the backpack 120 to provide the speaker backpack 122. The backpack 120 of the speaker backpack 122 had a back cloth portion that covered the back of the speaker 58, but as stated, the material similar to the back of the backpack 120 may be used to let the sound energy pass through. This may enable the phase cancelation process that was previously discussed. Likewise, the chair 124 may include a cover over the back of the speaker 58, but this is not intended to be a speaker box as previously disclosed in earlier embodiments herein. As with the speaker backpack 122, any cover over the back of the speaker 58 in the chair 124 may allow the sound energy to pass through with little interference.

The location of the speaker 58 in the chair 124 is depicted to be at a lower portion of the back of the chair 124. This is consistent with the previous embodiments of the speaker assembly 112. The intention is that the sound energy from the speaker 58 may be directed toward the lower spine of the user and pass up toward the head of the user, some of that energy potentially exiting through the vent 118. Again, the vent 118 may be positioned toward the top of the back 126 of the chair 124, which may be near the head of a user sitting in the chair 124. In this embodiment, the speaker assembly 112 may be inserted into a pocket 128 on the back 126 of the chair 124. Likewise, the speaker assembly 112 may be received into the back 126 of the chair 124 with little or none of the back of the speaker 58 visible from the back 126 of the chair 124. Again, it may be preferable that any materials that may be used to cover the back of the speaker 58 provide a minimal interference with the sound energy emanating from the back of the speaker 58.

Figure 42:
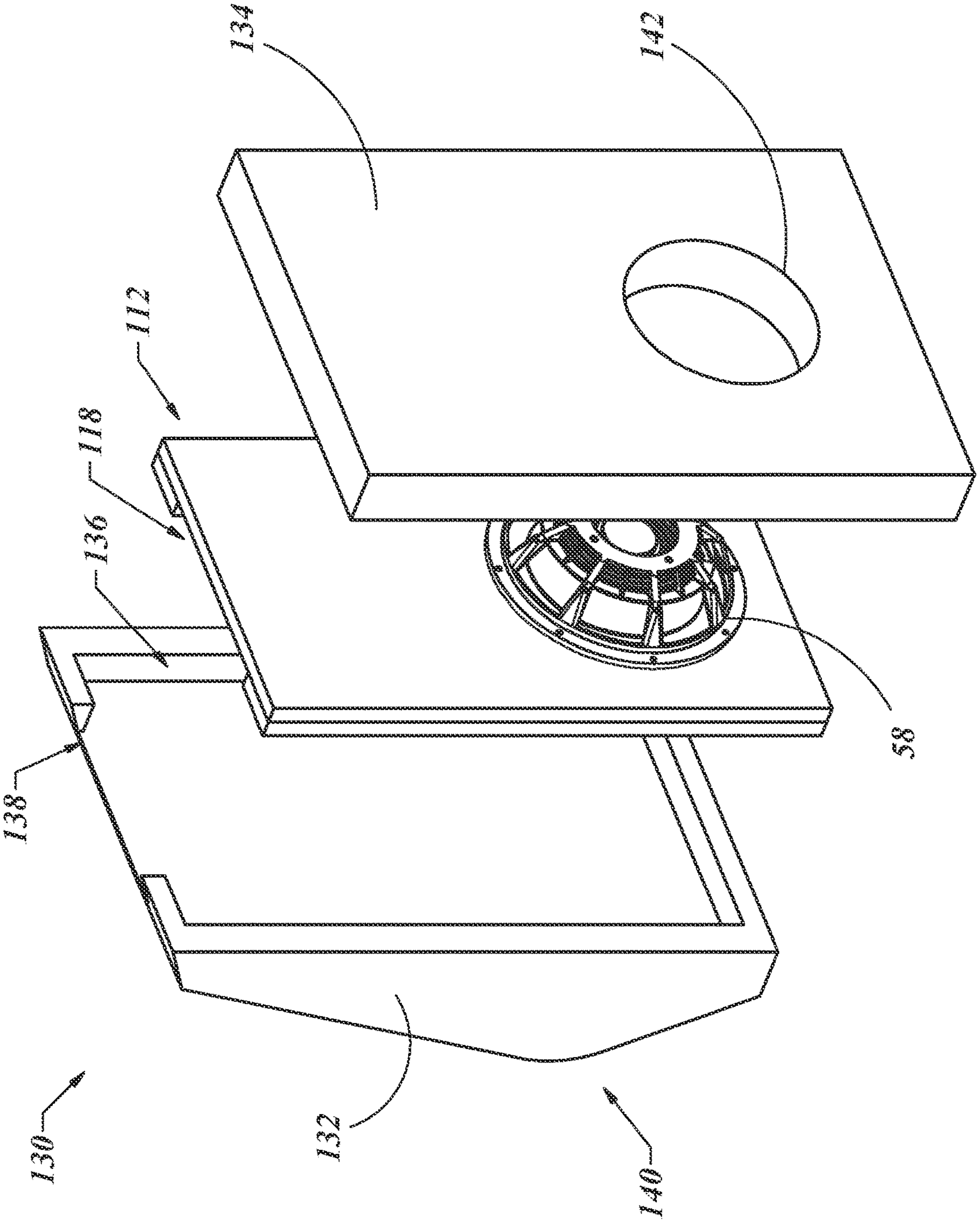
FIG. 42 is a partially exploded view of a speaker pillow with the speaker assembly positioned between an optional front cushion and an optional rear cushion.
Figure 44:
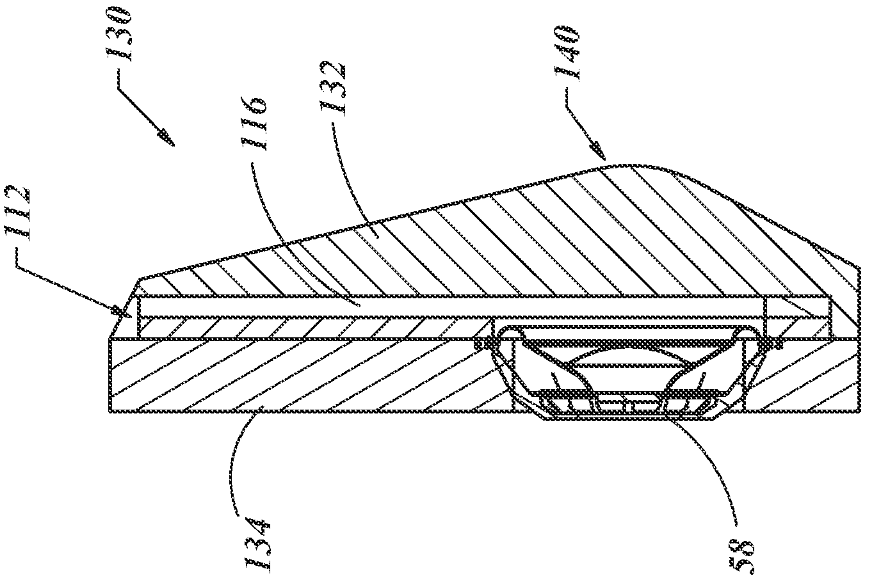
FIG. 44 is a section view of the speaker cushion of FIG. 43 cut along line 44-44.
Figure 43:
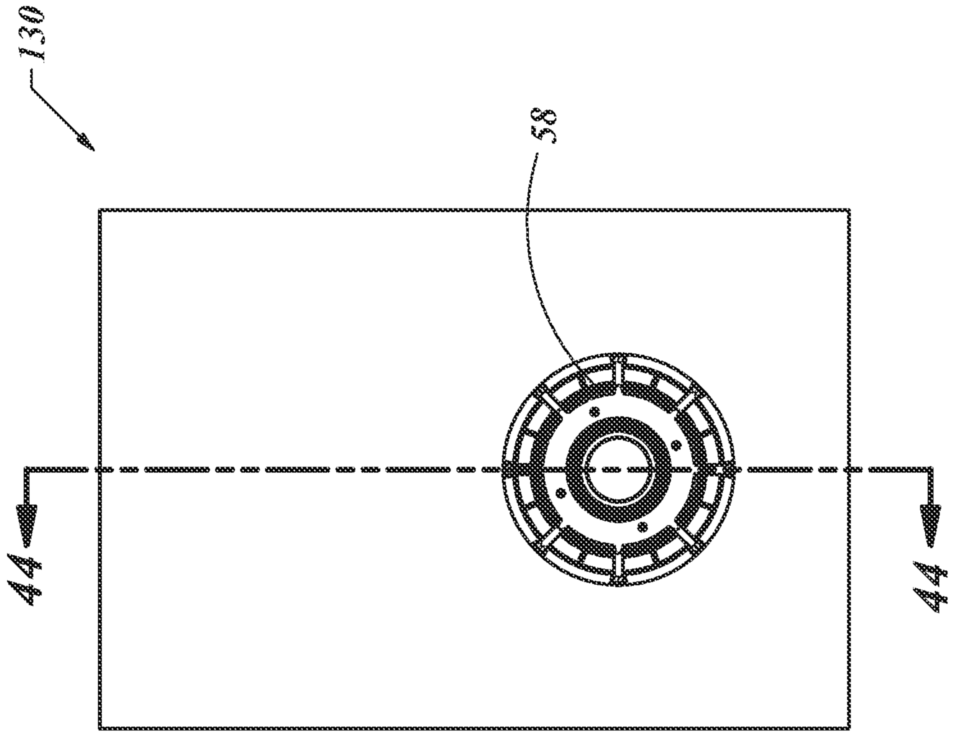
FIG. 43 is a rear view of an assembled version of the speaker pillow of FIG. 42.

Another application of the speaker assembly 112 is as a speaker pillow 130. In FIGS. 42-44 a speaker pillow 130 is shown as it may be produced to provide the desired attributes of the invention. The speaker assembly 112 may be positioned between a front cushion 132 and a rear cushion 134. The front cushion 132 may be constructed of a foam material such as a polyurethane or polypropylene foam. The front cushion 132 may be covered with a waterproof or water resistant material (not shown). The speaker assembly 112, as previously disclosed, may be received by a cutout 136 in the front cushion 132. This cutout 136 may act to help secure the speaker assembly 112 into position relative to the front cushion 132. This detail is not considered critical to the novelty of the invention, but may be considered a part of the preferred embodiment. The front cushion 132 may include a cushion opening 138 which may coincide with the location of the vent 118 in the speaker assembly 112. Though the material used to construct the front cushion 132 is not considered to be restrictive to passage of sound energy, the absence of any material in this location may be beneficial for the energy flow through the vent 118.

The speaker pillow 130 may include a lumbar support 140. The lumbar support 140 may have a comfort affect for the user in a seated position, but also people would inherently understand the lumbar support 140 is located toward the bottom of the speaker pillow 130. The speaker 58 may be positioned adjacent to the lumbar support 140, thereby orienting the speaker pillow 130 such that the speaker 58 may be located at the lower portion of the spine of the user. This is consistent with the previous embodiments using the speaker backpack 122 and the chair 124 in the preceding figures. The open portion 116 may then be positioned adjacent to the spine of the user with the vent 118 facing up in the direction of the head of the user. This embodiment may provide a shorter height of the speaker assembly 112 as compared to the chair 124, but the general purpose and orientation of the structures are consistent in each of the embodiments where the speaker 58 is substantially open to the back, or not otherwise enclosed.

The rear cushion 134 may or may not be used. The rear cushion 134 is shown here to include a cushion hole 142. The cushion hole 142 may be used to receive a portion of the back of the speaker 58 of the speaker assembly 112. This may help locate and secure the location of the rear cushion 134 to the speaker assembly 112 and at the same time reduce any interference to sound energy produced by the speaker 58 out of the back of the speaker 58. As previously noted, the unimpeded or minimally impeded sound energy flow from the back of the speaker 58 may be valuable to allow for phase cancelation of sound waves on the sides of the speaker assembly 112. This may be desirable in reducing unwanted sound by not disturbing others in the room while allowing the user to enjoy the sound energy directed at the user from the front of the speaker 58.

Figure 45:
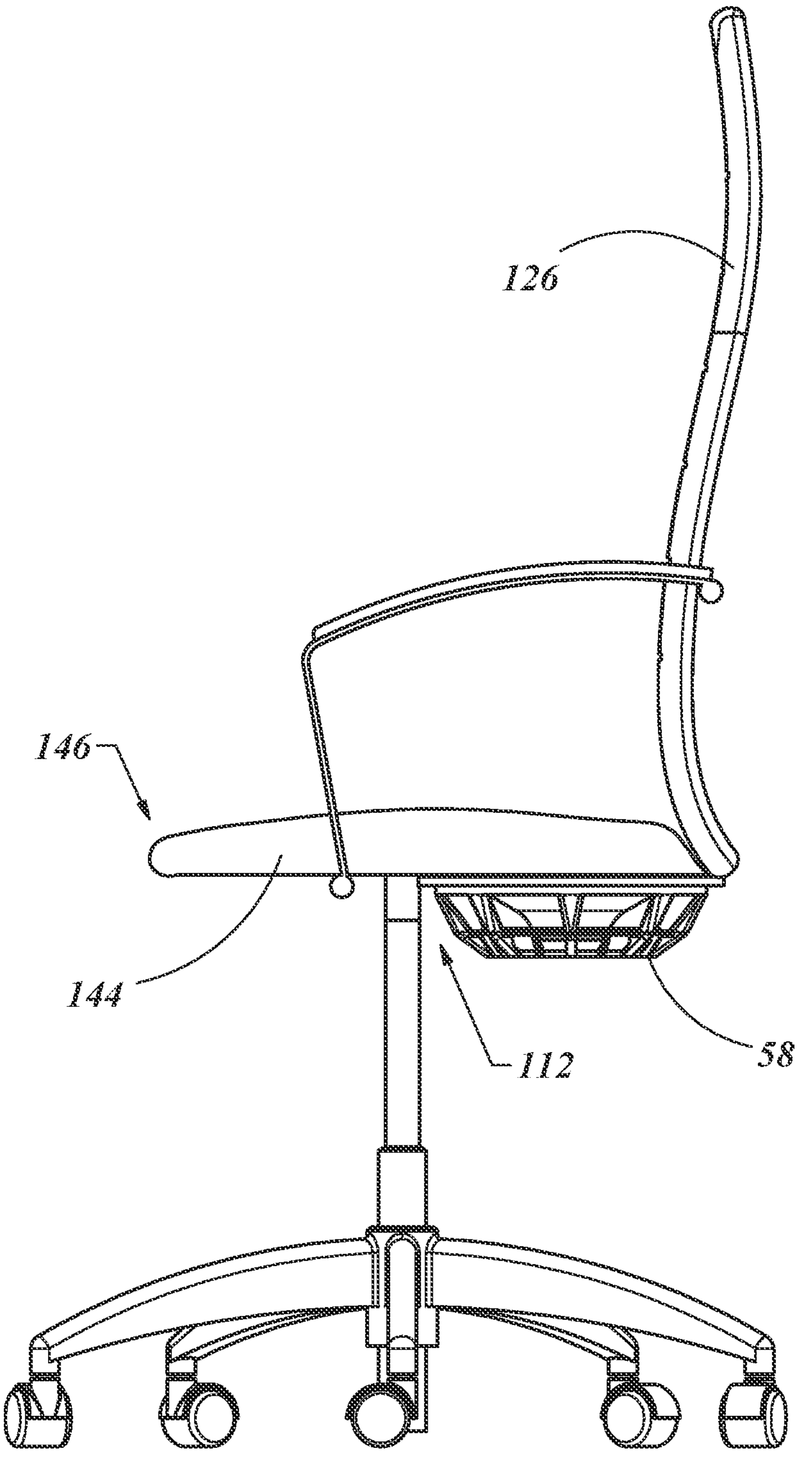
FIG. 45 is a side view of a chair with a speaker in the bottom of the chair, the speaker not including a speaker box.

An alternative embodiment of a speaker chair is shown in FIG. 45. In this embodiment the speaker 58 may be positioned on the seat bottom 144. A similar speaker assembly 112 may be used as previously disclosed, only positioned on or near the seat bottom 144 rather than the seat back 126. In this figure, the speaker 58 may be positioned nearer to the seat back 126 than to the front 146 of the seat bottom 144. In this way the sound energy produced by the speaker 58 may be directed closer to the spine of the user seated with the user's back against the seat back 126. The speaker 58 may also be positioned farther forward on the seat bottom 144, as deemed desirable by different chair bodies, speaker assemblies and the power output of the speaker 58.

Figure 46:
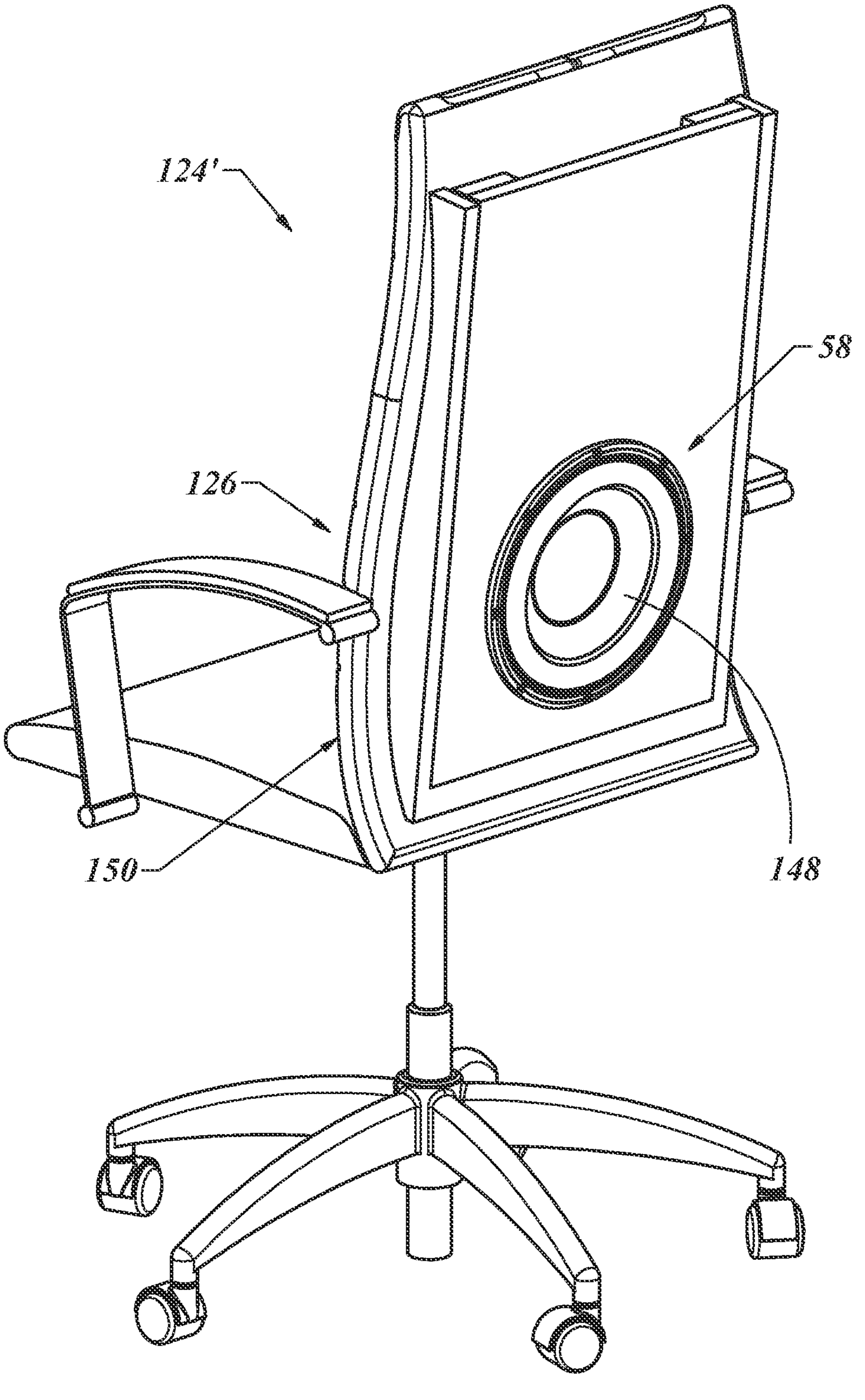
FIG. 46 is a left rear orthogonal view of a speaker chair with the speaker assembly positioned on a back portion of the chair, with the front of the speaker facing back, away from a user that may be seated in the speaker chair.

In FIG. 46 an alternative to the preferred embodiment is shown. Here the speaker 58 is reversed from that as shown in FIG. 39, in that what is generally considered to be the front portion 148 of the speaker 58 is positioned away from where a user would be seated in the chair 124'. In some speakers, especially low frequency or bass speakers, the sound energy that is produced out of the front portion 148 of the speaker 58 may be substantially equal to the sound energy that is produced out of the back of the speaker 58, therefore the speaker 58 may function similarly facing either direction in the chair 124'. In some cases it may be desirable to reverse the speaker 58 relative to the chair 124', as is shown in FIG. 46. In this example, the lumbar area 150 of the chair 124' may be thicker than some other portions of the seat back 126 of the chair 124'. Given that many bass speakers may have a significant thickness, the space in this lumbar area 150 may be used to house a good portion of the thickness of the speaker 58 without the speaker 58 extending out the back of the chair 124' while still directing a significant amount of bass energy toward the user seated in the chair 124'. A cover (not shown) could be used to cover the seat back 126, thereby virtually eliminating the outline of the speaker 58 in the chair 124' as viewed from the back without adding any material thickness to the seat back 126. This may not only be more aesthetically pleasing but it may save in shipping and storage space required for the chair 124'.

Figure 47:
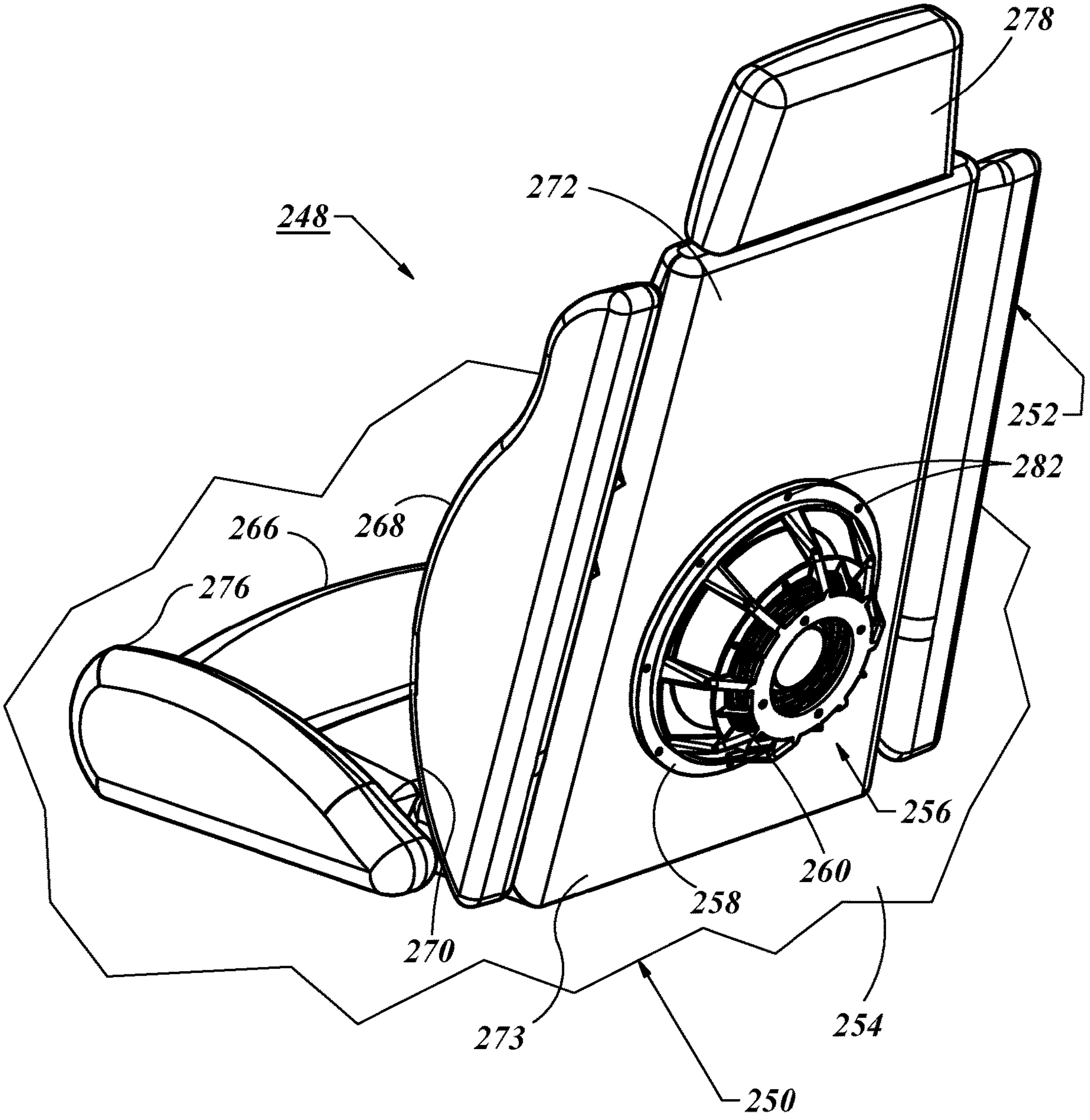
FIG. 47 is a left rear orthogonal view of a vehicle seat with the speaker assembly positioned on a back portion of the vehicle seat.
Figure 48:
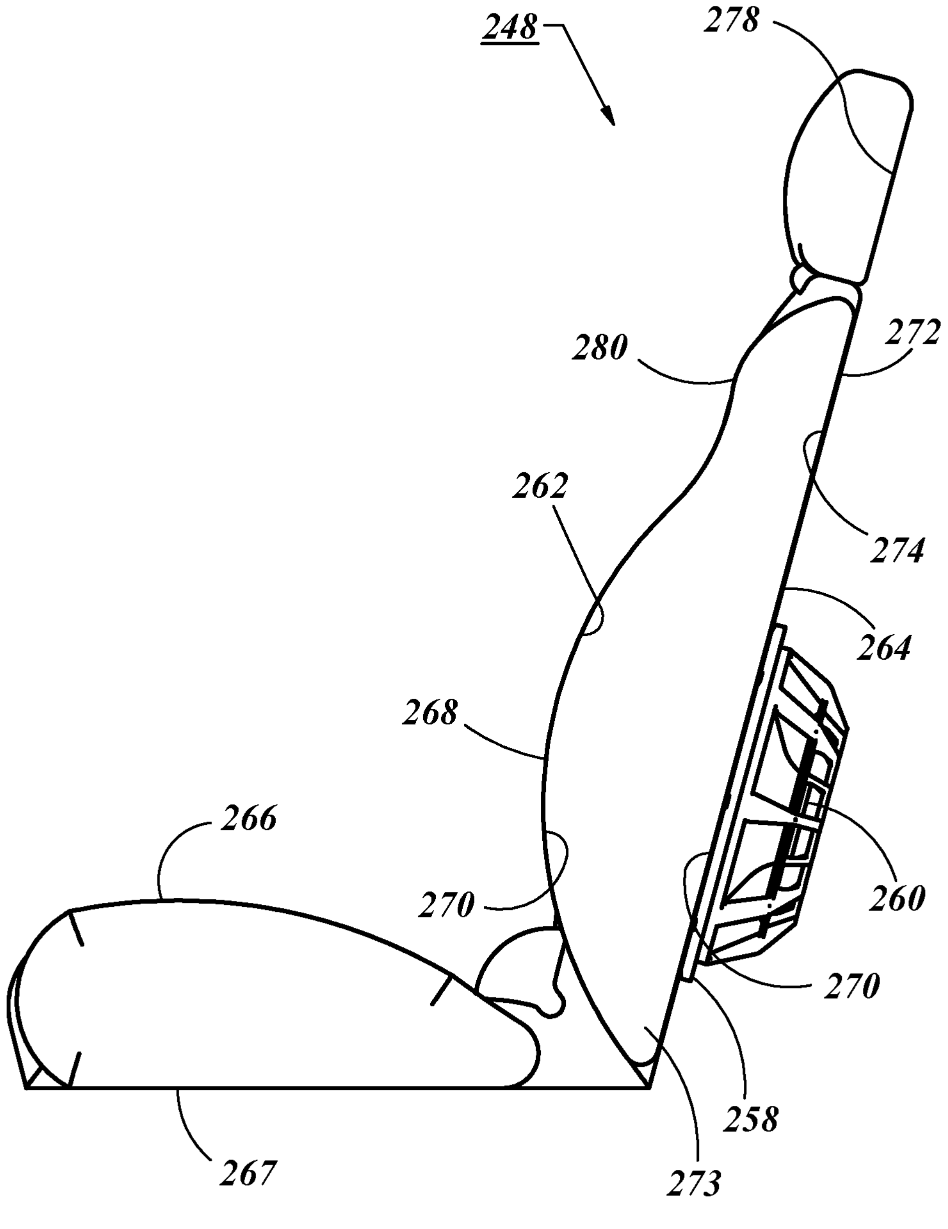
FIG. 48 is a left side view of the vehicle seat as presented in FIG. 47.

Referring now to FIGS. 47 and 48 there is shown an embodiment of a vehicle sound system 248 which is adapted to be mounted within a vehicle body 250 and fixedly mounted to a vehicle seat 252 in an area which does not pose an obstruction to a person sitting in the vehicle seat 252 whether the person is a driver of the vehicle or a passenger. The vehicle seat 252 is generally mounted to a vehicle floor, base or other section of the vehicle body 250 in a releasable manner well known in the vehicle industry. Alternatively, vehicle seat 252 may be mounted to the floor section 254 of the vehicle body 250 in fixed securement thereto not important to the inventive concept as herein described and shown.

The vehicle seat 252 is generally formed of a seat back member 264, a seat sitting member 266, a headrest 278, and a pair of armrest members 276 located on opposing transverse ends of the seat sitting member 266.

The vehicle sound system 248 further includes a speaker assembly 256 having a speaker frame 258 containing a speaker 260 as shown in one embodiment depicted in FIGS. 47-48. The speaker frame 258 and resulting speaker assembly 256 may be fixedly secured to the vehicle seat 252 through mounting members 282, which may be threaded attachment elements, bolts or other like securement mechanisms not important to the inventive concept except that such mounting member 282 provided a fixed securement to the vehicle seat 252.

Positioning and location of the speaker assembly 256 is important to the invention since such is directly a function of the audio quality and other sensory perceptions which are perceived by the person during operation of the speaker assembly 256. The speaker assembly frame 258 and resulting speaker assembly 256 may be mounted internal or external to the vehicle seat 252. In the embodiment shown in FIGS. 47-48 the speaker assembly 256 is mounted external to the vehicle seat 252, the speaker assembly frame is secured to an outer surface 262 of the vehicle seat 252 as is shown in the embodiment depicted in FIGS. 47 and 48 where the speaker assembly is mounted to a lower section 273 of the seat back member 264. In this embodiment the speaker assembly 256 is positioned contiguous an outer surface 262 of seat back member 264 and is shown in an uncovered state for purposes of explanation. However, the speaker assembly 256 may include a covering for aesthetic purposes to provide protection of the speaker 260 from external forces.

When the speaker assembly 256 is mounted internal to seat back member 264, the speaker assembly may be secured to an inner surface 274 of seat back member 264 or other components of the internal structure of the seat back member 264.

When the speaker assembly 256 is mounted to the seat back member 264 it may be mounted in either the seat back member 264 upper section 272 or the lower section 273. In the case where there are multiple speaker assemblies 256, such may be mounted to the seat back member 264 in a plurality of locations to provide the person with the audio quality and other sensory sensations desired.

As shown in the embodiment of FIGS. 47-48, the seat back member may include lumbar section 268 to provide for spinal support to the person. In a further embodiment the speaker assembly 256 may be located internal to lumbar section 268 and may be secured or mounted to an inner surface 270 or any other area of lumbar section 268.

In a further embodiment the speaker assembly 256 may be mounted internal or external to the seat sitting member 266. When the speaker assembly 256 is mounted external the seat sitting member 266 it is positioned below and adjacent the vehicle seat 252 and may be fixedly secured to the vehicle body floor section 254 in a manner previously described for mounting of the speaker assembly 256 to the seat back member 264. When the speaker assembly 256 is mounted internal to the seat sitting member 266 it may be fixedly secured to an inner surface 267 of the sitting member 266 or other structural components of the seat sitting member 266.

Alternatively, or in combination with other positioning or positional locations of the speaker assembly 256, such may be incorporated and in contiguous contact within or located external to and in contiguous contact with a headrest 278 of the vehicle seat 252.

Further, alternatively or in combination with other positioning and locations of the speaker assembly 256, it can be incorporated within or externally secured to at least one armrest 276 of the vehicle seat 252.

In summary with regard to FIGS. 47-48, there is shown one or more forms of the chair depicted in FIGS. 1-46 which may be a vehicle seat 252. The speaker 260 of the speaker assembly 256 may be positioned on the seat bottom 144, or as shown here, on the seat back 264. The speaker assembly 256 may be positioned in any location of the vehicle seat 252 that is not obstructive to the positioning of a user in the vehicle seat 252. In other words, the speaker assembly 256 may be positioned in any place on the vehicle seat 252 other than on the front side 280 of the vehicle seat 252, since the front side 280 is where a user would sit on the vehicle seat 252. The speaker assembly 256 may be used in accordance with any of the previously disclosed speaker layouts presented in this disclosure, which may include the use of the vent 118, as shown in FIG. 42, though not specifically shown in FIGS. 47-48. Likewise, the function and novelty of the previous embodiments may be included in this embodiment of the present invention. Additional speakers may be used in or near the head (as shown in FIG. 9) of the vehicle seat 252, headrest 278 or anyplace else deemed desirable to place a speaker.

The vehicle seat 252 is commonly understood to be a seat that is releasably coupled to a vehicle body of the type including a car, truck, airplane, train, bus, boat, bike, amusement rides, or any other body which may be used as a mode of transportation or movement. In essence, any vehicle body 250 that floats or has wings or wheels. As with the previous embodiments, the size of the speaker 260 as well as the precise location may be considered design alternatives, subject to personal preference. In FIGS. 47-48, the back of the speaker assembly 256 is shown to be uncovered. This is for illustrative purposes and it is understood that the speaker 260 may be covered in some way for appearance and protection of the speaker 260.

The foregoing detailed description of the present invention is provided for purposes of illustration, and it is not intended to be exhaustive or to limit the invention to the particular embodiment shown. The embodiments may provide different capabilities and benefits, depending on the configuration used to implement key features of the invention.

What is claimed is:

1. A vehicle sound system comprising:

a vehicle body;

a vehicle seat releasably secured to a section of said vehicle body; and, a speaker assembly including a front member with an elongate open portion and a speaker positioned adjacent to the open portion, the assembly having a speaker frame containing a speaker, said speaker assembly being secured to said vehicle seat in a manner selected from the group of: said speaker assembly being located internal said vehicle seat, said speaker assembly being located external said vehicle seat and positioned contiguous to an outer surface of said vehicle seat, said speaker assembly being located external said vehicle seat and positioned below and adjacent said vehicle seat and combinations thereof.

2. The vehicle sound system as recited in claim 1 wherein said vehicle seat includes a vehicle seat back member and a vehicle seat sitting member, said speaker assembly being secured external to said vehicle seat and fixedly secured to an outer surface of said vehicle back member.

3. The vehicle sound system as recited in claim 2 where said vehicle seat back member includes a vehicle seat lumbar section, said speaker assembly being secured to an inner surface of said vehicle seat lumbar section.

4. The vehicle sound system as recited in claim 3 where said speaker assembly is mounted adjacent said vehicle seat lumbar section.

5. The vehicle sound system as recited in claim 2 where said vehicle seat back member includes a vehicle back upper section, said speaker assembly being mounted to an outer surface of said vehicle back upper section.

6. The vehicle sound system as recited in claim 1 where said speaker assembly is mounted within a lumbar section of said vehicle seat back member.

7. The vehicle sound system as recited in claim 1 where said speaker assembly is mounted internal a vehicle sitting member, said speaker assembly being secured to an inner surface of said vehicle seat sitting member.

8. The vehicle sound system as recited in claim 1 wherein said vehicle seat includes a vehicle seat back member displaceable to and coupled to a vehicle seat sitting member, said speaker assembly is positioned internal said vehicle seat back member.

9. The vehicle sound system as recited in claim 8 wherein said speaker assembly is fixedly mounted to an inner surface of said vehicle seat back member.

10. The vehicle sound system as recited in claim 9 wherein said speaker assembly is mounted to a lumbar section of said seat back member, said speaker assembly being fixedly attached to an inner surface of said lumbar section of said seat back member.

11. The vehicle sound system as recited in claim 1 where said vehicle seat includes a headrest positioned above a seat back member of said seat member, said speaker assembly being fixedly mounted to said headrest.

12. The vehicle sound system as recited in claim 11 wherein said speaker assembly is secured to an external surface of said headrest.

13. The vehicle sound system as recited in claim 11 wherein said speaker assembly s secured to an inner surface of said headrest or a structural component within said headrest.

14. The vehicle sound system as recited in claim 1 wherein said vehicle seat includes at least one armrest, said speaker assembly being fixedly attached to said at least one armrest.

15. A method of creating a vehicle sound system comprising:

providing a vehicle body;

establishing a vehicle seat connected to said vehicle body and having at least a vehicle seat back member and a seat sitting member; and, securing a speaker assembly having a front member with an elongate open portion and a speaker positioned adjacent to the elongate open portion and also to said vehicle seat back member.

16. The method as recited in claim 15 wherein securing said speaker assembly includes the step of mounting said speaker assembly to an external surface of said seat back member.

17. The method as recited in claim 15 wherein securing said speaker assembly includes the step of mounting said speaker assembly within said seat back member.

18. The method as recited in claim 15 including mounting said speaker assembly within said seat sitting member.

19. The method as recited in claim 15 including mounting said speaker assembly external to and below said vehicle seat sitting member in fixed securement to said vehicle body.

20. A vehicle sound system of the type including a vehicle seat with a speaker, the vehicle seat being releasably secured to a vehicle body, the vehicle sound system comprising:

a speaker assembly comprising a front member including an elongate open portion with a top end and a bottom end and a speaker positioned adjacent to the elongate open portion between the top end and the bottom end, the speaker assembly coupled to a portion of the vehicle seat which is not obstructive to the positioning of a user in the vehicle seat.

21. The vehicle sound system of claim 20, wherein the vehicle body is the body of a vehicle selected from the group consisting of a car, truck, airplane, train, bus, boat, bike and an amusement ride.

* * * * *